(12) United States Patent
Demarco et al.

(10) Patent No.: US 10,091,068 B1
(45) Date of Patent: Oct. 2, 2018

(54) SYSTEM FOR MODELING DISTRIBUTED SYSTEMS

(71) Applicant: AMAZON TECHNOLOGIES, INC., Seattle, WA (US)

(72) Inventors: Paul Derek Demarco, Seattle, WA (US); Anton Vladilenovich Goldberg, Bellevue, WA (US); Michael James McInerny, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 341 days.

(21) Appl. No.: 14/727,179

(22) Filed: Jun. 1, 2015

(51) Int. Cl.
  *G06F 15/173* (2006.01)
  *H04L 12/24* (2006.01)
  *H04L 12/26* (2006.01)

(52) U.S. Cl.
  CPC .......... *H04L 41/145* (2013.01); *H04L 43/062* (2013.01); *H04L 43/0888* (2013.01)

(58) Field of Classification Search
  CPC .. H04L 41/145; H04L 43/062; H04L 43/0888
  USPC ................................. 709/224, 233
  See application file for complete search history.

(56) References Cited

U.S. PATENT DOCUMENTS

| | | | | |
|---|---|---|---|---|
| 7,269,599 B2 * | 9/2007 | Andreev | ............. | G06F 11/3447 |
| 7,836,356 B2 * | 11/2010 | Haas | ............. | G06F 11/008 |
| | | | | 714/47.1 |
| 8,625,757 B1 * | 1/2014 | Karpov | ............. | H04M 15/00 |
| | | | | 379/112.03 |
| 8,635,328 B2 * | 1/2014 | Corley | ............. | H04L 41/064 |
| | | | | 709/224 |
| 8,812,725 B2 * | 8/2014 | Kulkarni | ............. | H04L 43/0852 |
| | | | | 709/225 |
| 2005/0209513 A1 * | 9/2005 | Heruth | ............. | A61B 5/0476 |
| | | | | 600/301 |
| 2009/0054001 A1 * | 2/2009 | Westerberg | ............. | H04L 43/0858 |
| | | | | 455/67.11 |

* cited by examiner

*Primary Examiner* — David R Lazaro
*Assistant Examiner* — Mariegeorges A Henry
(74) *Attorney, Agent, or Firm* — Lindauer Law, PLLC

(57) ABSTRACT

Described are techniques for determining the effect of a change in how data is handled by a first device on other devices within a system. At a first device, sending, receiving, or processing of data may be prevented for a length of time. Metric data may be determined from other devices during the length of time and during one or more time periods before or after the length of time. The metric data may indicate the effect of the handling of data by a first device on the one or more other devices.

20 Claims, 9 Drawing Sheets

SYSTEM FOR MODELING DISTRIBUTED SYSTEMS

BACKGROUND

Distributed systems may include large numbers of computing devices. Factors associated with one or more computing devices within a distributed system may affect other computing devices within the distributed system.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
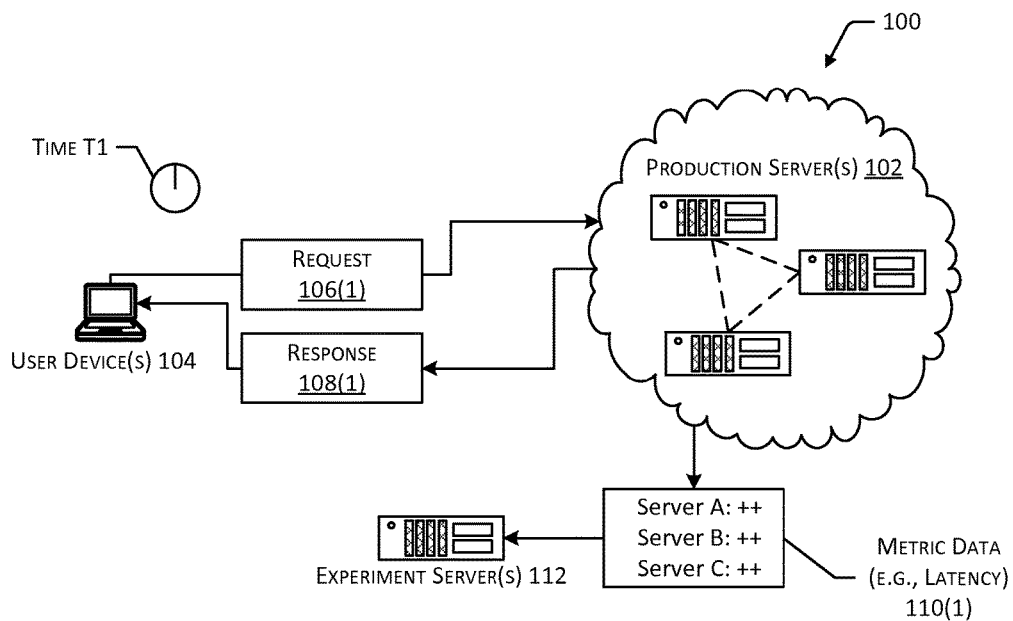
FIG. 1 depicts a scenario illustrating a method for determining relationships between devices within a distributed system by modifying the handling of data associated with one or more of the devices.
Figure 1:
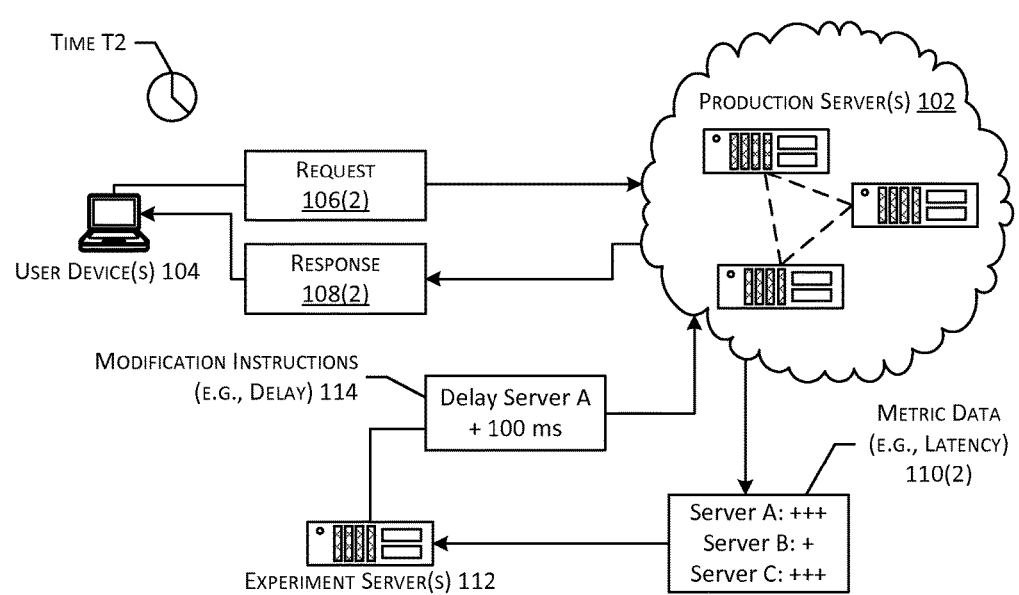

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

A distributed system may include multiple software or hardware-based components, such as servers, routers, load balancers, or other types of computing devices, which may communicate and coordinate actions through the sending, receiving, and processing of data via one or more networks. For example, a device within a distributed system may handle data by providing Application Programming Interface (API) calls or other types of messages or requests to other devices within the distributed system. The API calls or other types of requests may be configured to access processes, data, or other resources associated with those other devices. The communication of calls, messages, requests, and so forth, collectively referred to as "traffic," between devices may affect the latency, error rate, or processor utilization associated with those devices. Additionally, the handling of traffic associated with one or more devices within a distributed system (referred to as the "load" associated with that portion of the distributed system) may affect other devices within the distributed system due to the interrelations between devices. For example, the latency associated with a particular service on a first device may depend at least partially on the availability of resources on a second device. If a current load associated with the second device is high, greater latency associated with the particular service on the first device may be experienced, even during times when the load associated with the first device is low. User experiences when interacting with a distributed system may be negatively affected by a high latency, error rate, or processor utilization associated with one or more devices. However, the interactions and relationships between devices within a distributed system may be complex and in many cases unknown, hindering the reduction of latency, error rates, and processor utilization.

Described in this disclosure are techniques for determining the effect of the handling of data associated with one or more devices within a distributed system on the latency, error rate, processor utilization, or other metric values associated with other devices within the distributed system. During normal operations, devices within a distributed system may send and receive data requesting access to or transmitting one or more processes, resources, values, and so forth. This data, which may collectively be referred to as "live traffic", "production traffic", or "production data" may include requests to access processes, values, or other resources, transmissions containing values or the results of an executed process, and so forth. The production data may include data sent and received between devices within a distributed system, as contrasted to artificially generated traffic, traffic that is stored and replayed for load testing purposes, and so forth. For example, production data may be sent between servers, user devices, load balancing devices, and so forth. In some implementations, the production data may include data sent and received between the devices in real-time. The sending, receiving, or processing of data by a first subset of devices within a distributed system may affect various metric values associated with other devices within the distributed system. For example, a first device may provide a request to access a process associated with a second device. To respond to that request, the second device may provide a request to a third device to access a stored value. That third device may in turn send or receive data associated with one or more other devices within the distributed system. The handling of data associated with the third device or other devices that communicate with the third device may therefore affect the latency experienced by a user of the first device due to relationships between devices that are not readily apparent. Furthermore, in some cases, only a subset of data received or processed by a device may affect latency associated with other devices. For example, the number of threads available for a particular service or the number of devices permitted to access a particular value may be limited. A current load associated with that particular service or value may affect latency associated with particular requests provided by other devices, while other requests and other resources may be unaffected.

To determine relationships between devices within a distributed system, the handling of data associated with at least a portion of the devices within the distributed system may be modified to determine the impact of a change in the handling of data on the operations of other devices. Modification of the handling of data may include influencing the sending, receiving, or processing of data associated with one or more devices. In some implementations, modification of the handling of data may include influencing the sending, receiving, or processing of only a subset of data associated with the one or more device(s), such as requests relating to a particular process. In some implementations, modification of the handling of data may include changing the rate at which one or more devices send, receive, or process the data. For example, a device or group of devices may be prevented from one or more of sending, receiving, or processing data for a period of time, such as 10 to 100 milliseconds (ms). The sending of data associated with the device(s) may be delayed; data associated with the device(s) may be queued and held; processes used to generate data received by the device(s) may be delayed; the receipt of data by the device(s) may be prevented; and so forth. In other implementations, the rate at which data is sent, received, or processed by one or more devices may be slowed without wholly preventing the sending, receiving, or processing of data. In still other implementations, modification of the handling of data may include routing data to or from one or more particular devices, duplicating all or a portion of data associated with one or more devices, or deliberately causing processing or transmission at least a portion of the data (e.g., one or more requests) to fail.

Metric data associated with at least a subset of devices within the distributed system may be determined during the time period for which the handling of data is modified (the "delay time period" or "modification time period"). Additionally, metric data associated with one or more time periods before or after the modification time period may be determined. Metric data may include data indicative of latency, error rate(s), processor utilization, and so forth. For example, metric data determined before the modification time period may be indicative of metric values associated with one or more devices under normal conditions, absent or prior to a modification to the handling of data.

Metric data determined during the modification time period may be indicative of metric values associated with a reduction in the handling of data by one or more devices. For example, constraining or preventing the sending, receiving, or processing of data associated with one or more particular devices may reduce a load associated with the particular device(s) or other devices in communication with the particular devices. This reduction in load may in turn affect additional devices within the distributed system. Continuing the example, a reduction in the handling of data associated with a first device may increase latency in other devices to which data is routed due to the inability of the first device to receive, send, or process data during the modification time period. As another example, constraining or preventing the sending, receiving, or processing of data associated with the first device may increase latency in other devices performing operations that depend on data handled by the first device. As yet another example, a reduction in the handling of data associated with one or more first devices that provide data to subsequent devices may reduce latency in the subsequent devices due to the absence of data provided by the first devices. As another example, a reduction in the handling of a portion of data associated with a first set of devices may enable the first set of devices to process other types of requests during the modification time period with reduced latency. This may reduce the latency associated with other devices that provide other types of requests to the first set of devices.

Metric data determined after the modification time period may be indicative of metric values associated with an increase in the handling of data by one or more devices. For example, delaying sending, receiving, or processing of data for a period of time may cause the queuing of data associated with one or more device(s). Subsequent to the modification time period, the data within the queue may be released. A device may begin to send, receive, or process data released from the queue as well as additional data that is received during continued operation of the device, which may result in an increase in the handling of data by the device. Continuing the example, increased handling of data associated with particular devices may increase the latency associated with the particular devices and with other devices that communicate with the particular devices.

In some implementations, a notification may be provided to at least a subset of devices within a distributed system indicating a current or future time associated with a modification to the handling of data by one or more of the devices within the distributed system. The notification may be configured to cause devices that receive the notification to increase a rate at which metric data is determined. For example, a device may be configured to determine metric data once per minute during normal operations. Responsive to receipt of the notification, the device may begin determining metric data once per millisecond for a monitoring time period, which may include the modification time period as well as one or more additional time periods before or after the modification time period. In some implementations, a device may modify a rate at which metric data is determined automatically responsive to receipt of a notification. For example, a notification may include instructions or other data configured to interact with modules that determine metric data in one or more devices receiving the notification. In other implementations, notifications received by a device may be presented to one or more user interfaces for response by a user. In still other implementations, metric data may be determined from one or more devices without modifying the original rate at which the metric data is determined by the associated device.

Based on the metric data received from at least a subset of the devices within a distributed system, an effect of the handling of data by one or more devices on the handling of data by other devices within the distributed system may be determined. The effect may be used to determine relationships between devices. In some implementations, relationships between devices may be used to generate one or more graphs, equations, or models associating handling of data by a first device or a group of devices with the latency, error rate, processor utilization, and so forth, associated with a subset of devices within the distributed system. Modifications to the handling of data associated with one or more devices and the determination of metric data associated with the modifications may be repeated multiple times to improve the precision of the results and to determine metric data associated with other external factors, such as the date or time of day. In some implementations, historical data may be used to determine subsequent devices and subsequent modifications to the handling of data that may be used to determine relevant metric data. Historical data may also be used to determine a length of a delay time period that will not cause metric values to exceed one or more threshold values, such as values that may violate a service license agreement (SLA), provide an unacceptable user experience, or damage one or more system components.

In some implementations, particular requests or other types of data may be provided with an identifier, which may be used to determine the manner in which the particular data is routed or processed before, during, or after a modification to the handling of data. In other implementations, the identifiers associated with particular data may be used to modify the handling of data associated with subsequent devices within the distributed system. For example, a particular subset of data associated with a first device may be delayed, creating a queue of data that is subsequently processed by the device, simulating an increase in the handling of data associated with the device. The data associated with the increased handling of data may be transmitted to multiple other devices, which may indicate relationships between the first device and the other devices. However, in some implementations, queued data that is processed by the first device may be routed to or away from particular other devices or a subsequent delay may be introduced to data received by one or more of the other devices to further determine the impact of particular modifications to the handling of identified data on various portions of the system.

Implementations described in this disclosure may enable determination of the effect of the handling of data by one or more devices within a distributed system, on at least a subset of other devices within the distributed system. This effect may be determined with high fidelity while consuming minimal resources. By influencing the handling of existing data (e.g., "live traffic" or "production traffic") for existing devices during normal operations, metric data may be determined without generating or manipulating artificial data. By performing minor modifications to the handling of data, such as introducing a delay of 10ms to 100 ms, user experiences may be minimally affected or unaffected. Metric data, effects, and relationships determined from modifications to the handling of data may be used to determine additional devices for which to modify the handling of data, additional time periods during which to do so, and so forth. Determination of relationships between devices within a distributed system may enable the flow of data within the distributed system to be manipulated to maximize throughput and prioritize particular operations. Determination of relationships between devices within the distributed system may also enable a more rapid identification of potential errors or deficiencies associated with a device or network. For example, it may be determined that a value stored on a first device may be frequently updated by a process run by a second device. The process of the second device may require access to values stored on a third device. If significant latency affects the first device, both the second device and the third device may be investigated due to knowledge of these relationships.

FIG. 1 depicts a scenario 100 illustrating a method for determining relationships between devices within a network associated with a distributed system by modifying the handling of data associated with one or more devices. A distributed system of computing devices may include one or more production servers 102 or other types of computing devices or computer-readable storage media (CRSM). One or more production servers 102 or other devices within the distributed system may be accessible to one or more user devices 104. The user devices 104 may include any type of computing device, such as mobile devices, set-top boxes, tablet computers, personal computers, wearable computers, servers, and so forth. The production servers 102, while depicted as servers in FIG. 1, may include any type of computing device or storage media, such as the computing devices described previously. The production servers 102 and user devices 104 may communicate using one or more networks, such as local area networks (LANs), wireless LANs, wide area networks (WANs), wireless WANs, cellular networks, and so forth. For example, the production servers 102 and user devices 104 may include devices compatible with Ethernet, Wi-Fi, Bluetooth, ZigBee, Z-Wave, 3G, 4G, LTE, and so forth.

A user device 104 may attempt to access one or more resources associated with one or more production servers 102 by providing a request 106 to one or more of the production servers 102. One or more of the production servers 102 may in turn provide a response 108 to the user device 104 based on the request 106. For example, a user associated with a user device 104 may attempt to access a stored value or initiate a process associated with a particular production server 102 by providing a request 106 to the production server 102. Responsive to a request 106 indicative of that particular value or process, the production server 102 may provide the value or the result of the process to the user device 104 as part of the response 108. The generation and transmission of the response 108 by a particular production server 102 may depend on additional resources associated with other production servers 102. For example, prior to generating a response 108 for transmission to the user device 104, a first production server 102(1) storing a value may provide a request 106 to a second production server 102(2) to execute a process to update the stored value. Other production servers 102 may provide numerous requests 106 to the second production server 102(2) indicative of other resources, which may affect the manner in which with the second production server 102(2) handles data for transmission to the user device 104. For example, the latency associated with the generation of a response 108 to be provided to the first production server 102(1) may be affected by the handling of other data by the second production server 102(2). The handling of data associated with other production servers 102 may therefore affect the latency associated with the generation and transmission of a response 108 by the first production server 102(1) to the user device 104.

For example, at a first time T1, a user device 104 may provide a first request 106(1) to one or more production servers 102, and the production server(s) 102 may provide a first response 108(1) to the user device 104. One or more of the user device 104 or the production server(s) 102 may generate metric data 110 associated with the sending, receiving, or processing of the request 106. For example, a production server 102 may include modules or similar components for determining metric data 110, such as latency, error rates, processor utilization, load measurements associated with the production server 102, or other metric values associated with one or more operations of the production server 102. Continuing the example, a production server 102 may be configured to determine processor utilization or latency associated with responding to requests 108 for a particular process periodically, such as once per minute, once per ten seconds, once per second, or another length of time. In some implementations, an experiment server 112 or another device external to a production server 102 may be configured to determine the metric data 110 associated with one or more production servers 102. Metric data 110 associated with a production server 102 may be used to determine bandwidth and throughput limitations of the production server 102, relationships between various metric values and date or time of day, potential deficiencies in one or more production servers 102 or networks, relationships between production servers 102, and so forth.

One or more experiment servers 112 may determine metric data 110 from one or more of the production server(s) 102 or the user device(s) 104. For example, at time T1, FIG. 1 depicts first metric data 110(1) including an indication of moderate latency associated with three particular production servers 102. The experiment server(s) 112, while depicted as a server in FIG. 1, may include any type of computing device or storage media, such as those described previously, and may communicate with the production servers 102 or user device(s) 104 via one or more networks. While FIG. 1 depicts the experiment server(s) 112 as a separate device, in some implementations, one or more user devices 104 or production servers 102 may perform the functions of the experiment server(s) 112 described herein.

The experiment server(s) 112 may be used to affect the handling of data associated with one or more of the production servers 102. For example, FIG. 1 depicts the experiment server(s) 112 providing modification instructions 114 to one or more of the production servers 102 at a second time T2. The modification instructions 114 may be configured to delay, pause, or prevent the sending, receiving, or processing of data by a particular production server 102 for a period of time or to route data to or away from the particular production server 102. Continuing the example, the modification instructions 114 depicted in FIG. 1 indicate providing a "Delay" of "+100 ms" to "Server A." Modification of the handling of data associated with one or more of the production servers 102 may affect the latency, error rate, processor utilization, or other metric values associated with other production servers 102.

FIG. 1 depicts the user device 104 providing a second request 106(2) to one or more production servers 102 and the production server(s) 102 providing a second response 108(2) responsive to the request 106(2). Second metric data 110(2) corresponding to the operation may be determined from the production servers 102 or user device(s) 104 by the experiment server(s) 112. FIG. 1 depicts the second metric data 110(2) including an indication of high latency associated with "Server A," low latency associated with "Server B," and high latency associated with "Server C." The first metric data 110(1) may be generated in the absence of the modification instructions 114. The second metric data 110(2) may be generated at a time when transmission, receipt, or processing of data associated with a particular production server 102 is delayed. One or more of the first metric data 110(1) or the second metric data 110(2) may be used to determine relationships between one or more production servers 102 or other devices. For example, the latency associated with "Server C" may vary proportionally to the latency associated with "Server A," while the latency associated with "Server B" may vary inversely to the latency associated with "Server A" and "Server C."

Figure 2:
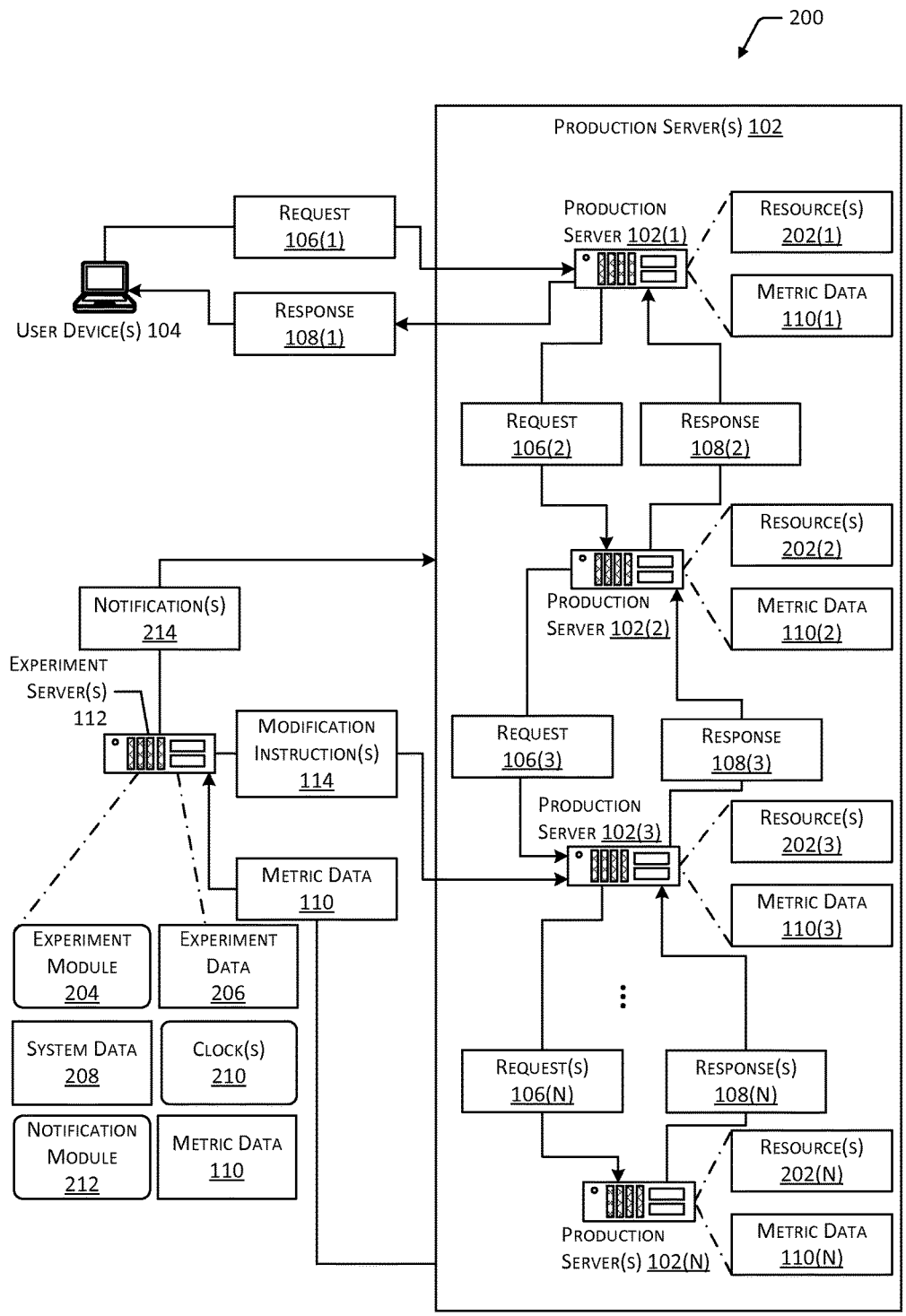
FIG. 2 depicts a system for determining relationships between devices within a distributed system based on the effect of the handling of data associated with one or more of the devices.

FIG. 2 depicts a system 200 for determining relationships between devices within a network based on the effect of the handling of data associated with one or more devices within the system 200. The system 200 may include one or more production servers 102 or other types of computing devices or CRSM, which may be accessible to one or more user devices 104. At least a portion of the production servers 102 may include one or more resources 202 stored in association with the production servers 102. Resources 202 may include one or more values, processes, or other types of data or programs that may be requested or accessed by other devices. For example, a user device 104 may provide a request 106 to one or more of the production servers 102 to access a resource 202, such as by executing a process or retrieving a stored value. The production server(s) 102 receiving the request 106 may process the request 106 and provide a response 108 to the user device 104 that includes the resources 202 (e.g., the requested value or the result of the requested process). During operation of the system 200, production servers 102 may provide requests 106 and responses 108 to other production servers 102 and other user devices 104. The production servers 102 may also include metric data 110 stored in association with the production servers 102. As described previously with regard to FIG. 1, metric data 110 may be generated by one or more modules or other components associated with at least a portion of the production servers 102, by one or more user devices 104, or by other computing devices in communication with the production servers 102.

FIG. 2 illustrates an example scenario in which a user device 104 provides a first request 106(1) to a first production server 102(1). For example, first resources 202(1), stored in association with the first production server 102(1), may include one or more stored values. A user of the user device 104 may intend to access a particular stored value associated with the first production server 102(1). The particular value associated with the first request 106(1) may depend on an operation performed by a second production server 102(2). For example, second resources 202(2), stored in association with the second production server 102(2), may include a process that updates one or more of the values of the first resources 202(1) stored in association with the first production server 102(1). Responsive to receipt of the first request 106(1), the first production server 102(1) may generate and provide a second request 106(2) to the second production server 102(2) to access a particular process. Performance of the process associated with the second production server 102(2) may in turn depend on one or more third resources 202(3) stored in association with a third production server 102(3). The second production server 102(2) may provide a third request 106(3) to the third production server 102(3) to access the third resources 202 (3). The third production server 102(3) may provide a third response 108(3) to the second production server 102(2) responsive to the third request 106(3). The second production server 102(2) may provide a second response 108(2) to the first production server 102(1) responsive to the second request 106(2). The first production server 102(1) may provide a first response 108(1) that includes the requested value to the user device 104 responsive to the first request 106(1).

Due to the relationship between the first production server 102(1), the second production server 102(2), and the third production server 102(3), a high latency, error rate, or processor utilization associated with the third production server 102(3) may affect the time that elapses before the first production server 102(1) provides the first response 108(1) to the user device 104. For example, one or more other production servers 102(N) may receive or provide requests 106(N) or responses 108(N) to one or more of the first production server 102(1), the second production server 102(2), or the third production server 102(3). (As used in this disclosure, letters in parenthesis, such as "N" indicate an integer value greater than or equal to zero.) Additionally, one or more of the first production server 102(1), the second production server 102(2), or the user device 104 may receive or provide requests 106 or responses 108 to or from the third production server 102(3) in addition to the requests 106 and responses 108 depicted in FIG. 2.

The quantity of data sent, received, or processed by the third production server 102(3) (e.g., the data handled by the third production server 102(3)) may affect the latency or other metric values associated with operations of the third production server 102(3). Thus, metric data 110(3) associated with the third production server 102(3) may impact the user experience of a user providing a request 106 to the first production server 102(1), even when the latency, error rate, and processor utilization of the first production server 102(1) and the second production server 102(2) are low. Furthermore, because the relationships between the production servers 102 may not be known or readily apparent to a user of the system 200, a user attempting to determine deficiencies associated with the production servers 102 or improve the user experience may not examine the third production server 102(3).

One or more experiment servers 112 may be used to determine relationships between production servers 102, such as the effect of the handling of data by at least one particular production server 102 on one or more other production servers 102. In some implementations, the experiment server(s) 112 may communicate with a load balancing device or one or more other intermediate devices (e.g., servers, routers, and so forth) to provide data to and receive data from the production servers 102. The experiment server(s) 112 may be used to modify the handling of data sent, received, or processed by one or more of the production servers 102. During the time that the handling of data associated with the production server(s) 102 is affected, metric data 110 from at least a subset of production servers 102 associated with the system 200 may be determined by the experiment server(s) 112. The experiment server(s) 112 may also determine metric data 110 from the subset of the production servers 102 during one or more time periods before or after the time during which the handling of data is affected. An experiment module 204 associated with the experiment server(s) 112 may be used to generate experiment data 206 indicative of one or more modifications to be applied to the handling of data associated with one or more of the production servers 102. For example, the experiment data 206 may indicate one or more of the following: particular production servers 102 for which the handling of data may be modified, a subset of data for which the handling may be modified, identifier(s) associated with the subset of data, a time at which the modification(s) to the data will be initiated, or a length of time during which the modification(s) will be maintained. The experiment data 206 may also include an indication of one or more production servers 102 from which metric data 110 will be determined, the length of time during which the metric data 110 will be determined, the rate at which metric data 110 may be determined during the length of time, and so forth. System data 208 may be accessed by the experiment module 204 to generate the experiment data 206. System data 208 may include a list of at least a portion of the production servers 102 associated with the system 200, resources 202 associated with one or more production servers 102, historical data associated with one or more production servers 102, and so forth.

The experiment module 204 may also be used to generate modification instructions 114, based on the experiment data 206, which may be provided to one or more of the production servers 102. The modification instructions 114 may be configured to cause one or more production servers 102 to modify the handling of data in a manner indicated by the experiment data 206. In some implementations, the modification instructions 114 may be provided to a load balancing device associated with the production servers 102. In other implementations, the modification instructions 114 may be provided directly to one or more production servers 102. One or more clocks 210 associated with the experiment server(s) 112 may provide information indicative of date, time, ticks, and so forth. For example, the experiment server(s) 112 may use data from the clock(s) 210 to generate a timestamp, determine the time at which modification instructions 114 or other transmissions are to be sent and the time at which metric data 110 or other types of data are received, determine the lapse of a time period associated with a modification, and so forth.

As a specific example, based at least partially on the system data 208, the experiment module 204 may generate experiment data 206 indicative of one or more modifications to the handling of data associated with the third production server 102(3). Continuing the example, the experiment data 206 may indicate that on Apr. 15, 2015, at 14:37:46:925, one or more of the sending, receiving, or processing of a particular subset of data associated with the third production server 102(3) will be prevented for 100 ms. Data that would have been sent, received, or processed, by the third production server 102(3) during the delay time period may be queued. The experiment data 206 may also indicate that after the lapse of the 100 ms delay time period, data from the queue will be released for sending or processing over a length of time, such as the subsequent 10 ms following the delay time period. A notification module 212 associated with the experiment server(s) 112 may be used to generate one or more notifications 214 indicative of at least a portion of the experiment data 206. The notification(s) 214 may be provided to one or more production servers 102. For example, a notification 214 may be configured to cause a production server 102 receiving the notification 214 to increase a rate at which metric data 110 is determined for a period of time corresponding to the delay time period. Continuing the example, one or more of the production servers 102 may increase the rate at which metric data 110 is determined to a rate of once per millisecond for a monitoring time period that includes the delay time period and one or more other lengths of time before or after the delay time period. In other implementations, the rate at which the metric data 110 is determined may remain unchanged.

Prior to the delay time period, one or more of the production servers 102 may determine metric data 110 indicative of normal operations of the system 200, during which each production server 102 sends, receives, and processes data absent any modifications associated with the experiment server(s) 112. After the modification instructions 114 have been provided to the third production server 102(3), the third production server 102(3) may cease one or more of sending, receiving, or processing a subset of data.

During the delay time period, one or more of the production servers 102 may determine metric data 110 indicative of operations of the system 200 during a reduction in the handling of data associated with the third production server 102(3). For example, data received by the third production server 102(3) prior to the start of the delay time period or data that is not associated with the modification instructions 114 may be processed by the third production sever 102(3) during the delay time period. Continuing the example, the third production server 102(3) may receive data from other production servers 102 prior to receiving modification instructions 114. The modification instructions 114 may be configured to prevent the sending of data by the third production server 102(3) for a delay time period without affecting the processing of data by the third production server 102(3). The third production server 102(3) may continue to process data received prior to the modification instructions 114 during the delay time period. As another example, the modification instructions 114 received by the third production server 102(3) may prevent one or more of sending, receiving, or processing a particular subset of data. However, the third production server 102(3) may continue to handle other types of data during the delay time period. The portion of data handled during the delay time period may be smaller than the data typically handled by the third production server 102(3) during normal operations. The decrease in the handling of data associated with the third production server 102(3), unrelated to the third response 108(3), may enable the third production server 102(3) to provide the third response 108(3) to the second production server 102(2) with reduced latency, error rate, or processor utilization, which may be indicated by a change in the metric data 110 determined by one or more of the production servers 102.

Subsequent to the end of the delay time period, one or more of the production servers 102 may determine metric data 110 indicative of operations of the system 200 during an increase in the handling of data associated with the third production server 102(3). For example, after data associated with the third production sever 102(3) is no longer delayed, the third production server 102(3) may concurrently receive both the delayed data released from the queue and data currently being provided to the third production server 102(3) from other sources. The increase in the handling of data associated with the third production server 102(3) subsequent to the delay time period may cause the third production server 102(3) to provide the third response 108(3) to the second production server 102(2) with increased latency, error rate, or processor utilization. These increased metric values may be indicated by metric data 110 determined by one or more of the production servers 102.

Metric data 110 from at least a portion of the production servers 102 may be determined by the experiment server(s) 112. The metric data 110 may be used to determine relationships between one or more production servers 102, such as the effect of the handling of data associated with a particular production server 102 on one or more other production servers 102.

Figure 3:
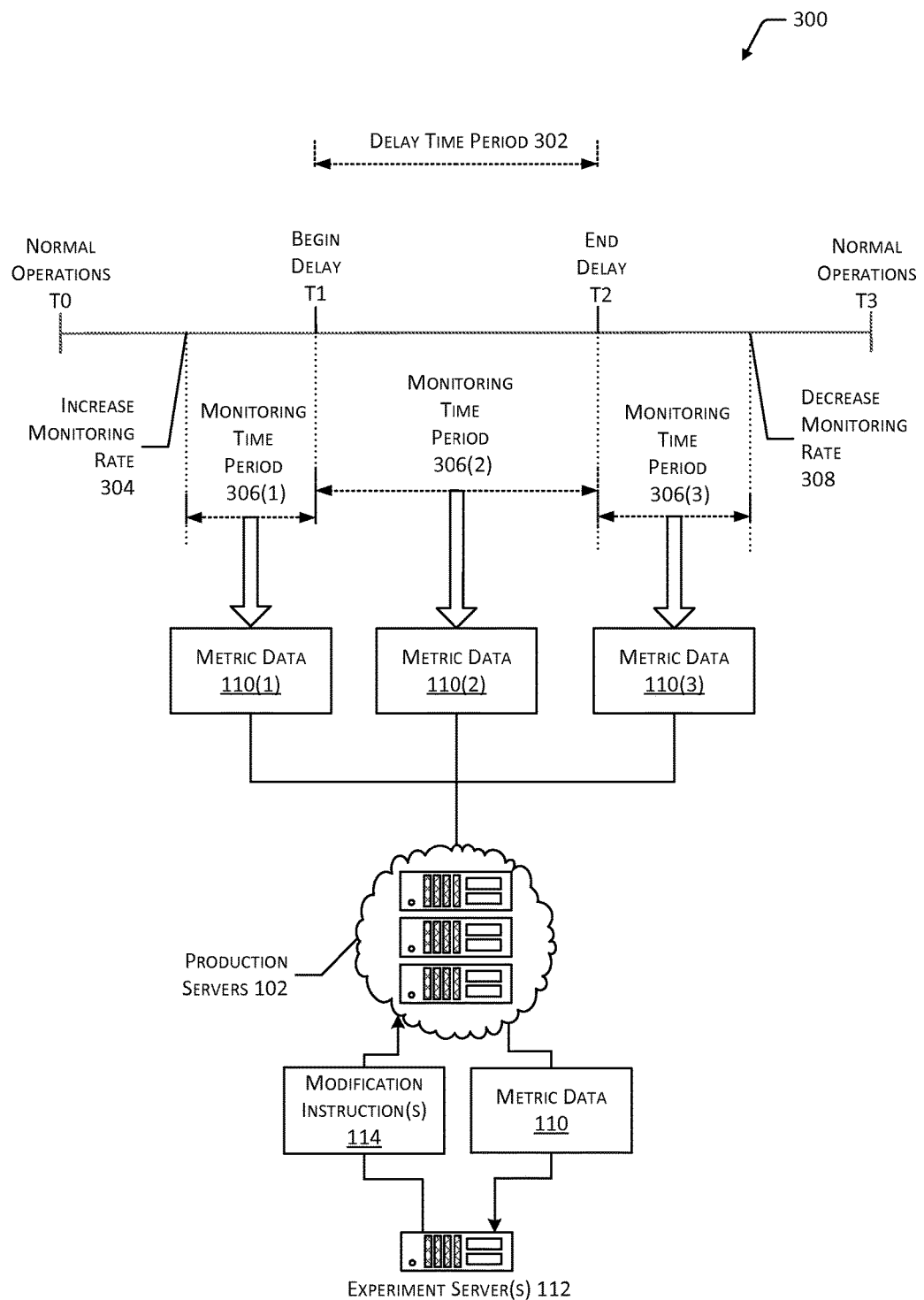
FIG. 3 depicts a timeline illustrating a process for determining metric data from one or more devices within a distributed system during different time periods.

FIG. 3 depicts a timeline 300 illustrating a process for determining metric data 110 from one or more devices during different time periods. As described previously with regard to FIG. 1 and FIG. 2, one or more experiment servers 112 may provide modification instructions 114 to one or more production servers 102 within a distributed system, such as system 200. The modification instructions 114 may, for example, be configured to prevent the sending, receiving, or processing of at least a subset of data for one or more production servers 102 during a delay time period 302. In other implementations, the modification instructions 114 may be configured to increase or decrease the rate at which the subset of data is sent, received, or processed. In still other implementations, the modification instructions 114 may be configured to route the subset of data to or from one or more production servers 102, to duplicate at least a portion of the data, or to cause transmission or processing of at least a portion of the data to fail. The length of the delay time period 302 may be determined using system data 208, which may include historical data, such as historical metric data 110, threshold values associated with one or more production servers 102, and so forth. In some implementations, the length of the delay time period 302 may be selected to minimize a negative impact associated with a user experience, such as a length ranging from 10 ms to 100 ms. In other implementations, such as when modifying processes that may not be directly experienced by a user, a greater length for the delay time period 302 may be used, such as up to one second, without negatively impacting user experiences. For example, based on the system data 208, the experiment module 204 may determine a maximum duration for a delay time period 302 that may exceed 100 ms without perceptibly affecting the user experience. Continuing the example, the system data 208 may include historic data indicating the latency experienced by a user responsive a delay in the handling of data by one or more devices. If the latency experienced by the user was not perceptible responsive to a delay of 100 ms, a longer delay may be used without noticeably impacting the user experience.

Prior to the start of the delay time period 302, indicated at T1 on the timeline 300, no modifications may be applied by the experiment server(s) 112 to the handling of data sent, received, or processed by the production servers 102. The length of time ranging from T0 to T1 on the timeline 300 may include times during which normal operations of the production servers 102 are performed, in the absence of or prior to modifications provided by the experiment server(s) 112. Prior to the start of the delay time period 302, one or more of the production servers 102 may increase the monitoring rate 304 associated with the determination of metric data 110. The increase of the monitoring rate 304 may be performed responsive to one or more notifications 214 provided by the experiment server(s) 112. For example, prior to increasing the monitoring rate 304, a production server 102 may determine metric data 110 at a first rate, such as once per minute, once per ten seconds, once per second, and so forth. Subsequent to increasing the monitoring rate 304, the production server 102 may begin to determine metric data 110 with greater frequency, such as once per two milliseconds, once per millisecond, twice per millisecond, and so forth. During normal operations, it may be cost-prohibitive or may unduly consume computing resources of the system 200 to determine metric data 110 with increased frequency. However, due to the temporary nature of the delay time period 302 (e.g., 10 ms to 100 ms) and the known time T1 at which the delay time period 302 will begin, the rate at which metric data 110 is determined may be increased during a monitoring time period 306 that corresponds to the delay time period 302. Subsequent to the end of the monitoring time period 306, the production server(s) 102 may decrease the monitoring rate 308. The time at which the monitoring rate is decreased may be determined based on the notification(s) 214 provided by the experiment server(s) 112. In some implementations, the notifications 214 may be provided prior to the first time T1 or prior to the time at which the monitoring rate is increased 304. In other implementations, a notification 214 to decrease the monitoring rate may be provided during the monitoring time period 306. For example, an experiment server 112 may provide multiple notifications to a production server 102, such as a first notification 214 to cause an increase in the monitoring rate and a second notification 214 to cause a decrease in the monitoring rate. In some implementations, different notifications 214 may be provided to different production servers 102 to cause changes in monitoring rates at different times.

In other implementations, the rate at which metric data 110 is determined by one or more of the production servers 102 may not be modified.

FIG. 3 depicts the monitoring time period 306 conceptually divided into a first monitoring time period 306(1), a second monitoring time period 306(2), and a third monitoring time period 306(3) for illustrative purposes. Prior to the start of the delay time period 302, the production servers 102 may determine first metric data 110(1) corresponding to the first monitoring time period 306(1). The first metric data 110(1) may include metric values corresponding to the handling of data by the system 200 during normal operations, prior to the modification of the handling of data caused by the experiment server(s) 112.

The second monitoring time period 306(2) may overlap with the delay time period 302. The production servers 102 may determine second metric data 110(2) during the second monitoring time period 306(2). The second metric data 110(2) may include metric values corresponding to a reduction in the handling of data associated with one or more production servers 102. For example, the sending, receiving, or processing of at least a portion of the data associated with a production server 102 may be prevented during the delay time period 302. In some implementations, the second metric data 110(2) may include metric values corresponding to an increase in the handling of data associated with one or more other production servers 102. For example, preventing sending, receiving, or processing of at least a portion of the data associated with a first production server 102(1) may increase the data handled by with other production servers 102 to which data is routed due to the unavailability of the first production server 102(1) during the delay time period 302. As another example, preventing sending, receiving, or processing of at least a portion of the data associated with a first production server 102(1) may increase the latency associated with other production servers 102 that provide requests 106 to the first production server 102(1) due to the inability of the first production server 102(1) to process the requests 106 during the delay time period 302. The end of the delay time period 302 is indicated at time T2 on the timeline 300.

Subsequent to the end of the delay time period 302, the production servers 102 may determine third metric data 110(3) corresponding to the third monitoring time period 306(3). The third metric data 110(3) may include metric values corresponding to an increase in the handling of data associated with one or more production servers 102. For example, preventing sending, receiving, or processing of at least a portion of the data associated with a production server 102 may cause a queue of data associated with that production server 102 to be generated. Subsequent to the end of the delay time period 302, the production server 102 may begin to process both data released from the queue and additional data received from other devices during the period of time spanning from time T2 to time T3 on the timeline 300. The quantity of data associated with the queue combined with additional data received by the production server 102 during the third monitoring time period 306(3) may exceed the data typically handled by the production server 102 during normal operations of the system 200. In some implementations, the increased handling of data associated with a particular production server 102 for which the sending, receiving, or processing of data was prevented may increase latency associated with other production servers 102 that provide or receive requests 106 or responses 108 to or from the particular production server 102. In other implementations, preventing the sending, receiving, or processing of data associated with the particular production server 102 may result in decreased latency associated with other production servers 102. For example, production servers 102 that may receive numerous requests 106 from the particular production server 102 during normal operations of the system 200 may receive fewer or less frequent requests 106 from the particular production server 102 during an increase in the handling of data by the particular production server 102. As another example, preventing sending, receiving, or processing of a subset of the data associated with a particular production server 102 may enable the production server 102 to process other types of requests 106 with less latency.

After the production server(s) 102 affected by the modification instructions 114 have processed, delayed, queued, paused, or diverted data, the system 200 may resume normal operations at time T3. The metric data 110 determined by the production servers 102 or by another computing device (e.g., a user device 104, server, and so forth) in communication with the production servers 102 may be provided to the experiment server(s) 112. FIG. 3 depicts metric data 110 determined during the monitoring time period 306 being provided to the experiment server(s) 112. In some implementations, metric data 110 determined during one or more time periods external to the monitoring time period 306, such as before or after the monitoring time period 306, may also be provided to the experiment sever(s) 112. The metric data 110 may be used to determine relationships between one or more production servers 102, such as the effect of the handling of data associated with a particular production server 102 on one or more other production servers 102. For example, an increase or decrease in the handling of data associated with a particular subset of production servers 102 may increase or decrease the latency, error rate, processor utilization, and so forth, of one or more devices associated with the system 200. Continuing the example, decreasing the handling of data associated with a first production server 102(1) may increase latency associated with a second production server 102(2) while decreasing latency associated with a third production server 102(3). At a time when it may be beneficial to maximize the throughput of the third production server 102(3), the routing, sending, receiving, or processing of data within the system 200 may be modified to decrease the data handled by the first production server 102(1).

Figure 4:
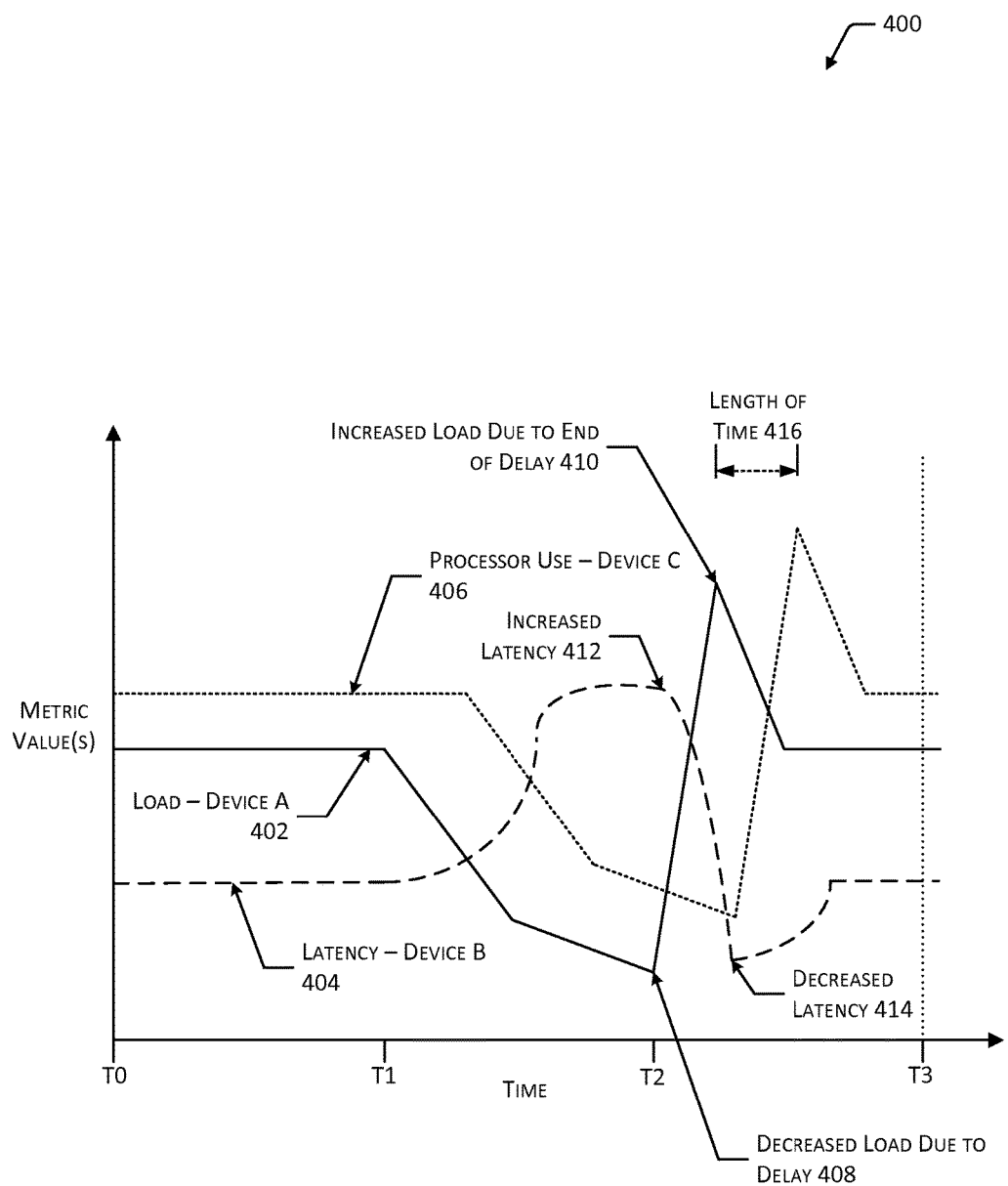
FIG. 4 depicts a graph of metric values for multiple devices, varying as a function of time.

FIG. 4 depicts a graph 400, showing an example variance in metric values for multiple devices, varying as a function of time. The X-axis of the graph 400 indicates the passage of time, while the Y-axis of the graph indicates metric values associated with multiple devices, such as production servers 102. Specifically, the graph 400 depicts the following: the variation of the load associated with a first device as a first line 402, labeled "Load—Device A"; the variation of latency associated with a second device as a second line 404, labeled "Latency—Device B"; and the variation of processor use associated with a third device as a third line 406, labeled "Processor Use—Device C."

As described previously with regard to FIGS. 1-3, the load associated with a first device may include the type or quantity of data handled by the first device, the manner in which the data is handled, and so forth. Between time T0 and time T1, the load associated with the first device may remain fairly constant, indicative of normal operations of the system 200 absent the influence of modifications applied by the experiment server(s) 112. While FIG. 4 depicts the first line 402 as horizontal between time T0 and time T1 for illustrative purposes, in other implementations, the load associated with the first device may vary or fluctuate in a regular or irregular manner between time T0 and time T1 depending on the particular data sent, received, or processed by the first device at each point in time and the manner in which the first device handles the data. At time T1, data sent, received, or processed by the first device may be prevented, constrained, delayed, paused, queued, or routed to other devices, based on the modification instructions 114 received from the experiment server(s) 112. The load associated with the first device may therefore decrease between time T1 and time T2, as indicated by the first line 402, which includes a region indicative of decreased load due to the delay 408.

At time T2, the delay time period 302 may end, and data not sent, received, or processed by the first device between time T1 and time T2 may be sent, received, or processed, queued for sending, receiving, or processing, and so forth, at or proximate to time T2. The combination of the data not received or processed by the first device between time T1 and time T2 and other data received by the first device between time T2 and time T3 may increase the load associated with the first device, as indicated by the first line 402. The first line 402 includes a region indicative of increased load due to the end of the delay 410. From time T2 to time T3, the first device may process and transmit the data that was delayed between time T1 and time T2. From time T2 to time T3, the load associated with the first device may approach normal operating conditions of the system 200, as illustrated by the first line 402 as it approaches time T3.

The second line 404 may illustrate how the latency associated with a second device may vary over time, based on the load associated with the first device. For example, between time T0 and time T1, the latency associated with the second device may remain fairly constant, indicative of normal operations of the system 200 absent the influence of modifications applied by the experiment server(s) 112 to the handling of data associated with the first device. While FIG. 4 depicts the second line 404 as horizontal between time T0 and time T1 for illustrative purposes, in other implementations, the latency associated with the second device may vary or fluctuate in a regular or irregular manner between time T0 and time T1 depending on the particular volume of data sent, received, or processed by the second device at each point in time and the manner in which the second device handles the data. Between time T1 and time T2, as the load associated with the first device decreases, the latency associated with the second device may increase, as indicated by the second line 404, which curves in an upward direction between time T1 and time T2 to a region indicative of increased latency 412. Between time T2 and time T3, as the load associated with the first device increases, then decreases, the latency associated with the second device may decrease, then increase, as indicated by the second line 404, which includes a region indicative of decreased latency 414. Based on the metric values illustrated by the first line 402 and the second line 404, a relationship between the first device and the second device may be determined. For example, the graph 400 illustrates that the latency associated with the second device may vary inversely based on the load associated with the first device in a non-linear manner. Continuing the example, while the first line 402 includes a varying linear slope, the second line 404 includes a series of curves, indicating a non-linear relationship between the values represented by the first line 402 and the second line 404. In other implementations, the latency associated with the second device may increase as the load associated with the first device increases, and may decrease as the load associated with the first device decreases.

In some implementations, the metric values associated with the devices may be used to determine one or more equations or models indicative of the relationship between the load associated with a first device and one or more metric values associated with devices within a system 200. For example, modifications to the handling of data associated with one or more particular devices may be applied to a production server 102 at multiple times to determine metric data 110 sufficient to generate a graph 400, equation, model, or other medium indicative of a relationship between devices. Continuing the example, a graph 400 may indicate that one or more processes performed by the second device may depend on resources 202 associated with the first device. When the handling of data associated with the first device is delayed, the processes associated with the second device may be similarly delayed due to the inability of the first device to provide responses 108 to requests 106 from the second device. As another example, when the handling of a first type of data associated with the first device is delayed, latency associated with the processes of the second device may decrease due to the increased availability of the first device to process other types of data. Additionally, a reduction in the amount of data provided by the first device to other devices may reduce latency associated with the other devices.

The third line 406 may illustrate how the processor use associated with a third device may vary over time, based on the load associated with the first device. For example, between time T0 and time T1, the processor use associated with the third device may remain fairly constant, indicative of normal operations of the system 200 absent the influence of modifications applied by the experiment server(s) 112 to the handling of data associated with the first device. While FIG. 4 depicts the third line 406 as horizontal between time T0 and time T1 for illustrative purposes, in other implementations, the processor use associated with the third device may vary or fluctuate in a regular or irregular manner between time T0 and time T1 depending on the particular operations performed by the third device at each point in time. Between time T1 and time T2, as the load associated with the first device decreases, the processor use associated with the third device may decrease, as indicated by the third line 406, which extends in a downward direction between time T1 and time T2, having a slope similar to that of the first line 302. Between time T2 and time T3, as the load associated with the first device increases, then decreases, the processor use associated with the third device may increase, then decrease, as indicated by the third line 406. Based on the metric values illustrated by the first line 402 and the third line 406, a relationship between the first device and the third device may be determined. For example, the graph 400 illustrates that the processor use associated with the third device may vary proportionally based on the load associated with the first device in a linear manner, offset by a generally constant length of time, indicated as 416 in FIG. 4. Continuing the example, the first line 402 includes varying linear slopes, and the third line 406 includes slopes parallel to those of the first line 402, offset by a fixed distance along the X-axis of the graph 400. In the example graph 400, the third line 406 also illustrates a value of the processor use of the third device greater than that of the load associated with the first device, indicative that an equation representative of the relationship between the two values may include an additive or multiplicative constant. For example, resources 202 associated with the third device may include a process that monitors or updates a value associated with the first device. When the handling of data associated with the first device is delayed, the process associated with the third device may use a smaller quantity of processing resources.

Figure 5:
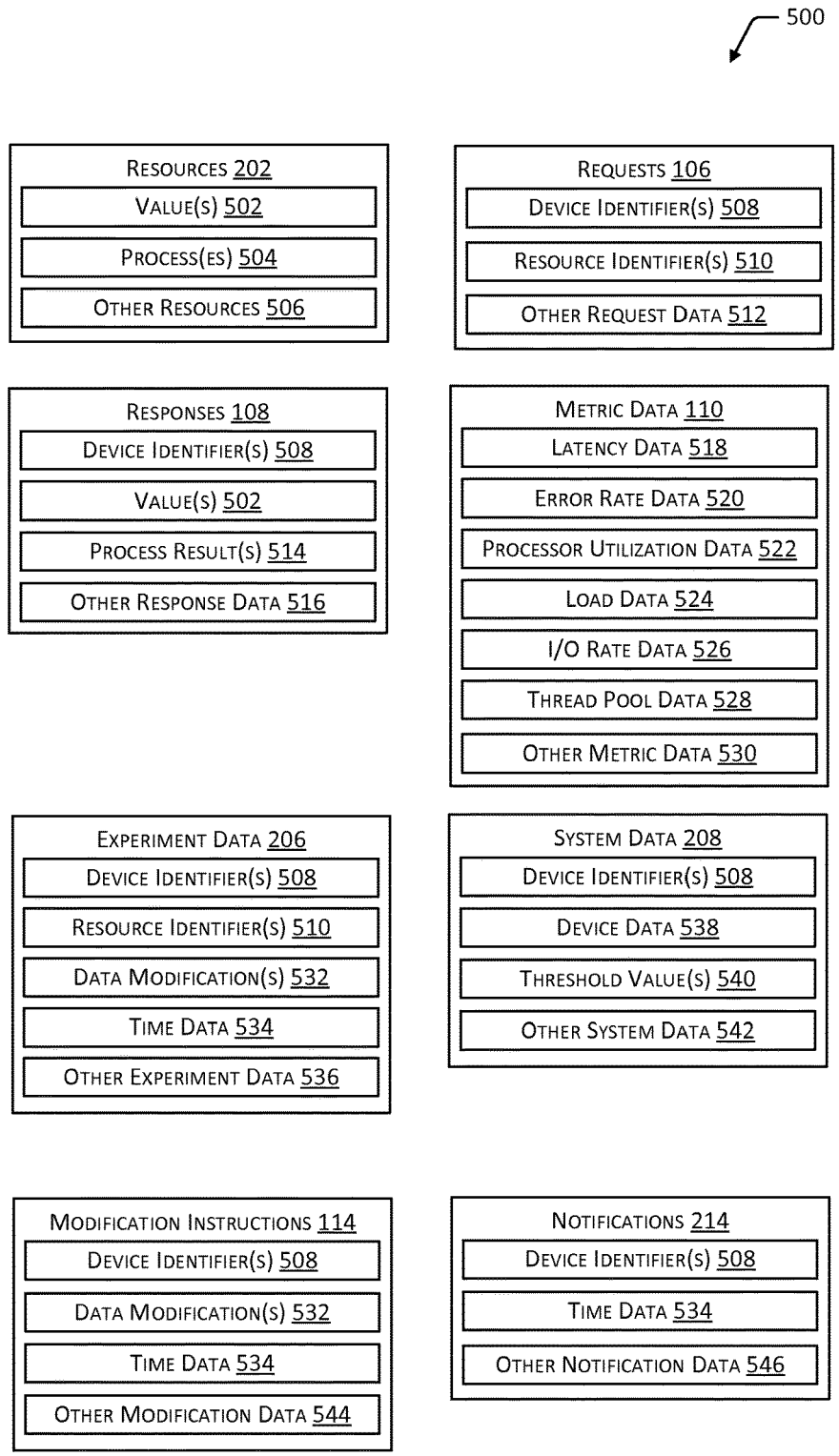
FIG. 5 depicts a block diagram illustrating examples of resources, requests, responses, metric data, experiment data, system data, modification instructions, and notifications.

FIG. 5 is a block diagram 500 illustrating examples of resources 202, requests 106, responses 108, metric data 110, experiment data 206, system data 208, modification instructions 114, and notifications 214.

Resources 202 may include any content stored in association with a computing device, such as a production server 102, which may be requested or accessed by other devices. For example, resources 202 may include values 502, which may include any manner of stored data. A value 502 may include alphanumeric data, image data, audio data, video data, and so forth. Continuing the example, a value 502 may include a price, quantity, name, description, or tax rate associated with an item. A user associated with a user device 104 may attempt to access a stored value 502 to modify a price or tax rate. A process associated with a production server 102 or other computing device may attempt to access a stored value 502 to modify a quantity, price, tax, and so forth associated with an item when one or more items are purchased. Resources 202 may also include one or more processes 504. Processes 504 may include any manner of program, service, application, daemon, thread, or other types of instructions that may be used to cause a computing device to perform one or more operations. For example a production server 102 or other computing device may execute a process 504 to query or modify values 502 or other data from a remote location and provide updated values 502 to other devices responsive to a request 106. Other resources 506 may include any manner of data or instructions that may be accessed or requested by other devices. For example, other resources 506 may include programs for monitoring a status of one or more devices, determining metric data 110, and so forth.

Requests 106 may include data indicative of one or more resources 202 to be accessed by a requesting device. For example, a first device may provide a request 106 to a second device to access one or more resources 202 associated with the second device. A request 106 may include one or more device identifiers 508. Device identifiers 508 may include one or more identifiers associated with the device(s) providing the request 106. Device identifiers 508 may also include one or more identifiers associated with the device(s) to which the request 106 is provided. Device identifiers 508 may include any manner of data, including an alphanumeric string, image data, video data, audio data, and so forth. For example, a device identifier 508 may include an Internet Protocol (IP) address, a Media Access Control (MAC) address, a name of a device, a location of a device, a network address or identifier associated with a device, data indicative of one or more hardware or software components associated with a device, and so forth. In some implementations, a device identifier 508 may include machine-readable data that may not be readily understandable to a human user. Requests 106 may also include one or more resource identifiers 510. Resource identifiers 510 may include one or more of alphanumeric data, image data, video data, audio data, and so forth, used to identify one or more resources 202 to which access is requested by a requesting device. For example, a resource identifier 510 may include a name of a process 504 or value 502, a filename, an alphanumeric string found within a value 502 or set of values 502, a location of a particular value 502 within a table, a name or location of a particular storage medium or device, and so forth. Other request data 512 may include a time associated with the request 106, information regarding the format or destination of a response 108 to the request 106, encryption data, and so forth. In some implementations, other request data 512 may include an identifier associated with the request 106, which may enable the manner in which the request 106 is routed and processed within a system 200 to be determined.

Responses 108 may be provided, responsive to one or more requests 106, to a requesting device or to one or more other destinations indicated in the request 106. A response 108 may include one or more device identifiers 508, which may indicate one or more of the device(s) providing the response 108 and the device(s) to which the response 108 is sent. A response 108 may also include one or more values 502 that correspond to resources 202 associated with the resource identifiers 510 of the request 106. If a request 106 indicated one or more processes 504 associated with a receiving device, the response 108 may include one or more process results 514. Process results 514 may include any manner of data generated or modified by a process 504 executing on a device, such as modified values 502, an indication that a value 502 is current, output generated by a process 504 using one or more values 502 or other resources 506, and so forth. Other response data 516 may include error indications, such as indications that particular devices or resources 202 corresponding to the device identifiers 508 or resource identifiers 510 of the request 106 do not exist, could not be located, did not respond, or have failed. Other response data 516 may include an indication that a requesting device lacks the proper credentials to access a resource 202. In some implementations, other response data 516 may include an identifier associated with the response 108, which may enable the manner in which the response 108 is routed and processed within a system 200 to be determined. The identifier associated with the response 108 may be identical to that of the corresponding request 106 or may include data indicative of the request 106. The identifier associated with the response 108 may be used to determine the manner in which both the response 108 and the corresponding request 106 are handled and routed. In other implementations, the identifier associated with the response 108 may differ from that associated with the request 106, which may enable the response 108 and a corresponding request 106 to be traced differently.

Metric data 110 may include data indicative of one or more measurements relating to the sending, receiving, or processing of data by one or more devices. For example, metric data 110 may include latency data 518 indicative of the delay between input to a device, such as a production server 102, and the corresponding output. Latency data 518 may include a length of time (e.g., a quantity of milliseconds), an average value (e.g., the mean latency associated with multiple operations), a subjective measurement of latency (e.g., high or low latency), a comparative measurement of latency (e.g., increased or decreased from latency a previous time period, or greater or less than a reference value), and so forth. The latency data 518 may be specific to one or more particular operations, such as the transmission, receipt, or processing of requests 106 or responses 108 relating to a particular resource 202 or set of resources 202. In other implementations, the latency data 518 may be specific to one or more devices or groups of devices, such as all operations performed by a particular production server 102 during a period of time.

Metric data 110 may also include error rate data 520. Error rate data 520 may indicate a number or percentage of packets or other portions of data that were not properly sent, received, or processed. For example, the error rate data 520 may include a bit error rate, bit error ratio, packet error rate, packet error ratio, bit error probability, packet error probability, and so forth. Error rate data 520 may be expressed as a quantitative measurement, a subjective measurement (e.g., high or low error rate), a comparative measurement (e.g., increased or decreased from a previous error rate, or greater or less than a reference value), and so forth. In some implementations, the error rate data 520 may be specific to one or more particular operations or one or more particular devices. In other implementations, the error rate data 520 may include a value pertaining to multiple operations or devices over a single time period or multiple time periods.

Metric data 110 may further include processor utilization data 522. Processor utilization data 522 may include a measurement of central processing unit (CPU) usage for one or more devices. For example, the processor utilization data 522 may include a measurement indicative of a number of cycles performed by a processor within a period of time. Processor utilization data 522 may include a quantitative measurement (e.g., a number of processor cycles), a subjective measurement (e.g., high, low, or moderate processor utilization), a comparative measurement (e.g., greater or less than a reference value or a previous measurement), and so forth. Processor utilization data 522 may correspond to one or multiple operations, devices, or time periods.

Metric data 110 may also include load data 524. Load data 524 may include a measurement of the amount of computational work performed by a device or portion of a system 200 at a particular instance in time or over a period of time. In some implementations, load data 524 may include an indication of a quantity of data (e.g., packets) handled by a device at a particular instance in time or during a period of time, an indication of a manner in which data is handled, and so forth. Load data 524 may include a load average, which may be expressed as multiple measurements representing a system load during previous time intervals, such as one minute, five minutes, and fifteen minutes. Load data 524 may include a quantitative measurement (e.g., a numerical value), a subjective measurement (e.g., high, moderate, or low), a comparative measurement (e.g., greater or less than a reference value or a previous measurement), and so forth. Load data 524 may correspond to one or multiple operations, devices, or time periods.

Metric data 110 may additionally include input/output (I/O) rate data 526. I/O rate data 526 may include a measurement of a rate at which one or more devices provides data to, processes data, or receives data from an associated network or other associated computing or storage devices. I/O rate data 526 may include an average value associated with multiple devices, a discrete value for one or more devices, a quantitative measurement (e.g., a numerical value), a subjective measurement (e.g., high, moderate, or low), a comparative measurement (e.g., greater or less than a reference value or a previous measurement), and so forth.

Metric data 110 may further include thread pool data 528. Thread pool data 528 may include values such as a number of threads created to perform particular operations, a number of threads destroyed, a rate at which threads are created or destroyed, times at which threads are created or destroyed, a number of operations in a queue associated with the threads, a number of operations completed by the threads, and so forth. For example, the thread pool data 528 may indicate that 1,322 threads are currently running on a particular device, that 123 threads were created within the last minute, and that 255 threads were destroyed within the last minute. Thread pool data 528 may include an average value associated with multiple devices, a discrete value for one or more devices, a quantitative measurement (e.g., a numerical value), a subjective measurement (e.g., high, moderate, or low), a comparative measurement (e.g., greater or less than a reference value or a previous measurement), and so forth.

Other metric data 530 may include measurements indicative of the performance of one or more devices or portions of a system 200, such as a temperature of one or more devices, whether a user is currently accessing one or more devices, a quantity of memory available to one or more devices, and so forth. Other metric data 530 may also include external factors that may affect one or more other metric values. For example, at particular time of day, a typical latency, error rate, or processor utilization associated with a device may be greater or less based on a typical quantity of user traffic associated with that device. As another example, specific days, such as holidays or weekends, may affect one or more metric values.

Experiment data 206 may be indicative of one or more parameters of an experiment used to determine relationships between devices within a system 200. For example, experiment data 206 may include one or more device identifiers 508 indicative of devices, such as production servers 102, to which one or more modifications may be applied. The device identifiers 508 may also indicate devices from which metric data 110 may be determined. The devices from which metric data 110 is determined may include devices other than those to which modifications are applied.

The experiment data 206 may also include one or more resource identifiers 510. The resource identifiers 510 may be indicative of one or more subsets of data to which modifications are to be applied. For example, the experiment data 206 may indicate that a modification is to be applied to the handling of data relating to a particular operation by all or a portion of the production servers 102 within a system 200 that are configured to perform the particular operation, such as updating a value 502 corresponding to an item.

The experiment data 206 may additionally include one or more data modifications 532. The data modifications 532 may be indicative of one or more changes to the handling of data associated with one or more devices. For example, a data modification 532 may include the prevention of one or more of sending, receiving, or processing a particular subset of data for one or more devices. As another example, a data modification 532 may include increasing or decreasing the rate of sending, receiving, or processing data. Data modifications 532 may also include routing data from one or more devices to one or more other devices. Data modifications 532 may further include duplicating all or a subset of data associated with one or more devices to increase the quantity of data received, processed, and handled by a device. Data modifications 532 may also include causing the sending, receiving, or processing of at least a portion of data associated with one or more devices to fail. For example, a data modification 532 may include preventing successful send, receiving, or processing of a packet, a request 106, or another portion of data. The data modifications 532 may be used by the experiment server(s) 112 to generate the modification instructions 114 to be provided to one or more devices.

The experiment data 206 may further include time data 534. Time data 534 may indicate times at which modification instructions 114 may be generated, times at which modification instructions 114 may be provided to production servers 102 or other devices, times at which data modifications 532 to the handling of data may be initiated or ended, times during which rates for determining metric data 110 may be increased or decreased, the times at which metric data 110 may be determined, times at which notifications 214 may be provided, and so forth.

Other experiment data 536 may include additional experiment parameters, such as an identification of particular devices that may be used to provide modification instructions 114 or notifications 214, particular devices that may be used to determine metric data 110, particular dates, times, or events that may affect the metric data 110 determined during a monitoring time period 306, and so forth. In some implementations, the other experiment data 536 may include identifiers associated with particular requests 106 or responses 108 that may be used to determine the manner in which requests 106 or responses 108 are processed and routed within the system 200. For example, the other experiment data 536 may include additional data modifications 532 to be performed with regard to requests 106 received by a subsequent device after being processed by a first device.

System data 208 may be indicative of one or more devices, parameters, or characteristics of the system 200. For example, the system data 208 may include device identifiers 508 indicative of at least a subset of the devices that are associated with the system 200 or accessible by the system 200. Additionally, system data 208 may include device data 538, which may include characteristics of one or more of the devices that correspond to the device identifiers 508. For example, the device data 538 may indicate particular hardware or software components associated with one or more devices, particular networks or protocols used by particular devices, device configurations, and so forth. The device data 538 may be used to determine particular devices that may be suitable or unsuitable for receipt of modification instructions 114 or determination of metric data 110. Device data 538 may also include historical data associated with one or more devices. For example, device data 538 may include metric data 110 determined during previous time periods. Based on historical data, possible relationships between devices may be determined, and data modifications 532 may be used to generate modification instructions 114 to confirm or disprove such relationships. As another example, historical data may indicate previous conditions that caused violation of an SLA, hindered one or more system components, or created an unacceptable user experience. Subsequent modification instructions 114 generated based on historical data may include data modifications 532 and time data 534 selected to minimize the likelihood of such deviations. As yet another example, historical data may include identifiers associated with particular requests 106 or responses 108 indicative of the manner in which the requests 106 or responses 108 were handled or routed. Based on the historical data, subsequent modification instructions 114 may include data modifications 532 associated with one or more of the devices to which the requests 106 or responses 108 were handled or routed.

The system data 208 may also include one or more threshold values 540. In some implementations, the threshold values 540 may include minimum or maximum values of metric data 110, including one or more of one or more latency data 518, error rate data 520, processor utilization data 522, load data 524, or other metric data 530. For example, a threshold value 540 may include a maximum quantity of latency that may be present in a device without violating a SLA. As another example, a threshold value 540 may include a maximum processor utilization value for a particular device that will not damage the device or consume resources in a manner that may hinder the system 200. In other implementations, a threshold value 540 may include a reference value and a maximum quantity by which one or more metric values may deviate from that reference value. For example, deviation from a reference value by more than a threshold quantity may violate a SLA, provide an unacceptable user experience, or potentially damage or hinder system components. The threshold values 540 may be used to prematurely end a delay time period 302 or other types of data modifications 532. For example, if one or more metric values exceed a threshold maximum, fall below a threshold minimum, or deviate from a reference value by a threshold quantity, modifications to the handling of data may be ceased, and a system 200 may be permitted to return to normal operations. In some implementations, the modification instructions 114 may include one or more threshold values 540 and instructions to cease modifications to the handling of data based on the threshold values 540 and determined metric data 110.

Other system data 542 may include characteristics of networks that may be relevant for establishing communication with the system 200, or various protocols, configurations, settings, and so forth, relating to one or more devices. Other system data 542 may also include encryption data, credentials that may be used to access the system 200, and so forth.

Modification instructions 114 may be provided by experiment server(s) 112 to production servers 102 or other devices to cause modification to the handling of data associated with particular devices. In some implementations, modification instructions 114 may also be provided to devices other than those to which data modifications 532 are to be applied. For example, modification instructions may include instructions regarding the determination of metric data 110 during a monitoring time period 306. A first production server 102(1) may receive modification instructions 114 indicating a data modification 532 to be made to the handling of data by a second production server 102(2). The modification instructions 114 may cause the first production server 102(1) to modify a rate at which metric data 110 is determined during a monitoring time period 306.

The modification instructions 114 may include device identifiers 508 indicative of the devices processing, sending, or receiving the modification instructions 114. The device identifiers 508 may also indicate devices to which data modifications 532 are to be applied and devices from which metric data 110 is to be determined. The modification instructions 114 may also include data modifications 532 indicative of one or more changes to the handling of data associated with one or more devices. The modification instructions 114 may further include time data 534 indicative of times at which communications between devices may be provided, times at which data modifications 532 may begin and end, times during which metric data 110 may be determined, times at which rates of determination of metric data 110 may be increased or decreased, and so forth.

Other modification data 544 may include changes to the rate at which metric data 110 may be determined by one or more devices, resource identifiers 510 corresponding to particular subsets of data to which one or more of the data modifications 532 may apply, threshold values 540 indicative of metric values that may result in prematurely ending the data modifications 532, and so forth. In some implementations, other modification data 544 may include identifiers associated with particular requests 106 or responses 108. For example, the identifiers associated with particular requests 106 or responses 108 may be used to determine devices to which the requests 106 or responses 108 were handled or routed. Subsequent modification instructions 114 may be provided to those devices to further determine the effects of the handling of data by those devices on other devices within the system 200.

Notifications 214 may be provided from experiment servers 112, or other devices in communication with the experiment servers 112, to production servers 102 or other types of computing devices. The notifications 214 may be used to inform one or more users regarding data modifications 532 to be applied to one or more devices within a system 200. Notifications 214 may include at least a portion of the time data 534 associated with the data modifications 532. In some implementations, the notifications 214 may be configured to cause a receiving device to perform one or more operations in the absence of user intervention. For example, notifications 214 may be configured to cause a receiving device to increase a rate at which metric data 110 is determined at a first time, to decrease the rate at which metric data 110 is determined at a second time, and to provide the determined metric data 110 to the experiment server(s) 112.

The notifications 214 may include device identifiers 508 indicative of the devices processing, sending, or receiving the notifications 214. Notifications 214 may also include time data 534, which may indicate times at which data modifications 532 may begin and end, times during which metric data 110 may be determined, times during which rates of determination of metric data 110 may be increased or decreased, and so forth. Other notification data 546 may include device identifiers 508 associated with devices for which handling of data will be modified, at least a portion of the data modifications 532, resource identifiers 510 indicative of the subset of data that may be affected by the data modifications 532, threshold values 540 that may cause the data modifications 532 to be removed, and so forth.

Figure 6:
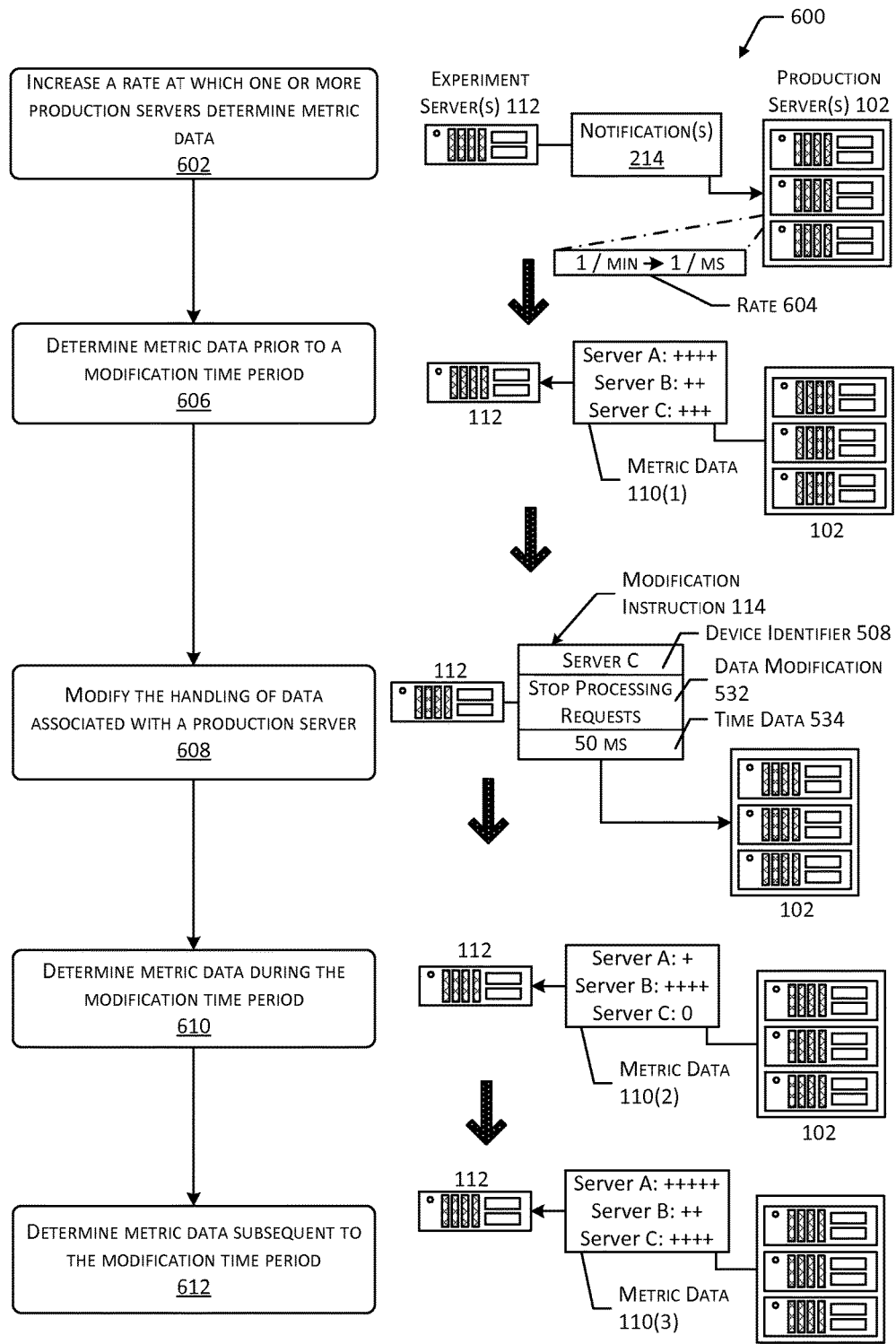
FIG. 6 illustrates a method for determining metric data from one or more devices within a distributed system during different time periods relative to a modification time period.

FIG. 6 illustrates a method 600 for determining metric data 110 from one or more devices during different time periods relative to a modification time period. At 602, a rate 604 at which one or more production servers 102 determine metric data 110 may be increased. In some implementations, one or more experiment servers 112 may provide a notification 214 to one or more of the production servers 102. The notification(s) 214 may indicate a first time at which the rate 604 for determination of metric data 110 is to be increased based on a second time at which modification instructions 114 will be provided to one or more of the production servers 102. For example, the rate 604 may be increased prior to the time at which the modification instructions 114 are provided, which may enable metric data 110 corresponding to operations of a system 200 prior to the data modifications 532 to be determined while also reducing the likelihood that a device will fail to collect metric data 110 during the subsequent modification time period. In the depicted method 600, the rate 604 at which metric data 110 is determined by one or more of the production servers 102 is increased from an initial rate 604 of one determination per minute (1 determination/minute) to an increased rate 604 of one determination per millisecond (1 determination/ms). In some implementations, the modification instructions 114 may also include a time at which the rate 604 for determination of metric data 110 may be decreased, such as subsequent to the modification time period. In still other implementations, the rate 604 for determination of metric data 110 may remain unchanged for one or more production servers 102.

At 606, metric data 110 prior to a modification time period may be determined. For example, first metric data 110(1) associated with one or multiple production servers 102 may be determined prior to providing modification instructions 114 to a production server 102. Metric data 110 determined prior to providing the modification instructions 114 may be indicative of normal operations of a system 200 at the particular time when the metric data 110 is acquired. The first metric data 110(1) may be determined from all devices within a system 200 or only a portion of devices within the system 200. In the depicted method 600, the first metric data 110(1) includes an indication of very high latency for a first production server 102(1), "Server A," moderate latency for a second production server 102(2), "Server B," and high latency for a third production server 102(3), "Server C."

At 608, the handling of data associated with a production server 102 may be modified. For example, a modification instruction 114 may be provided to one or more of the production servers 102 to affect the sending, receiving, or processing of data. FIG. 6 depicts the modification instruction 114 including a device identifier 508 indicative of a particular production server 102, "Server C." The depicted modification instruction 114 also includes a data modification 532 indicating that the particular production server 102 is to stop processing requests 106. The modification instruction 114 also includes time data 534 indicating that the data modification 532 will continue for a duration of 50 ms. In other implementations, the device identifier 508 may indicate other production servers 102 or multiple production servers 102. In still other implementations, the data modification 532 may indicate that one or more production servers 102 may stop sending requests 106 or stop receiving requests 106, in addition to or in place of a modification to processing of requests 106. Other data modifications 532 may include modifying the rate at which data is sent, received, or processed without preventing the sending, receiving, or processing of the data. In some implementations, data modifications 532 may include routing the data to or from a particular production server 102 or set of production servers 102, duplicating at least a portion of the data, or causing sending, receiving, or processing of at least a portion of the data to fail. The duration of the data modification 532 indicated by the time data 534 may be selected to minimize effects of the data modification 532 on individual user experiences.

At 610, metric data 110 may be determined from one or more of the production servers 102 during the modification time period. The metric data 110 may be determined from all or only a portion of the devices in the system 200. For example, while "Server C" ceases processing requests 106, the handling of at least a subset of the data associated with "Server C" may be delayed, defining a delay time period 302. During the delay time period 302, second metric data 110(2) determined from the production servers 102 may be indicative of operations of the system 200 during a reduction in handling of data associated with "Server C." For example, the depicted second metric data 110(2) indicates a low latency associated with "Server A," a very high latency associated with "Server B," and no latency associated with "Server C."

At 612, metric data 110 may be determined from one or more of the production servers 102 (e.g., all or only a portion of devices within the system 200) subsequent to the modification time period. For example, after the end of the duration indicated by the time data 534, the data modification 532 affecting "Server C" may cease. During the time that the production server 102, "Server C", is not processing requests 106, data that is not processed may be queued. Subsequent to the end of the modification time period, the production server 102 may begin to handle both data released from the queue and other data that may be received by the production server 102 during normal operations of the system 200. FIG. 6 depicts third metric data 110(3) indicating extremely high latency for "Server A," moderate latency for "Server B," and very high latency for "Server C." Based at least partially on the metric data 110 determined from the production servers 102, relationships between the production servers 102 may be determined. For example, the latency associated with "Server A" may vary proportionally with the data handled by "Server C." Continuing the example, "Server A" may receive data from "Server C" subsequent to processing of the data by "Server C." During the modification time period when "Server C" is prevented from processing requests 106, "Server A" may not have received data from "Server C," reducing the latency associated with "Server A." The latency associated with "Server B" may vary inversely with the load associated with "Server C." For example, "Server B" may perform similar operations to those performed by "Server C." During the modification time period when "Server C" is prevented from processing requests 106, other devices may instead route data to "Server B", increasing the latency associated with "Server B."

Subsequent to 612, the rate 604 at which metric data 110 is determined by one or more of the production servers 102 may be decreased if the rate 604 was increased at 602. The initial modification instructions 114 provided to the production servers 102 may be configured to cause the rate 604 to be decreased at a specific time subsequent to the modification time period or after a specific duration. In other implementations, additional instructions may be provided to production servers 102 subsequent to the modification time period to change the rate 604. For example, subsequent to the modification time period, the rate 604 may be returned to the original value of the rate 604 prior to the modification time period.

Figure 7:
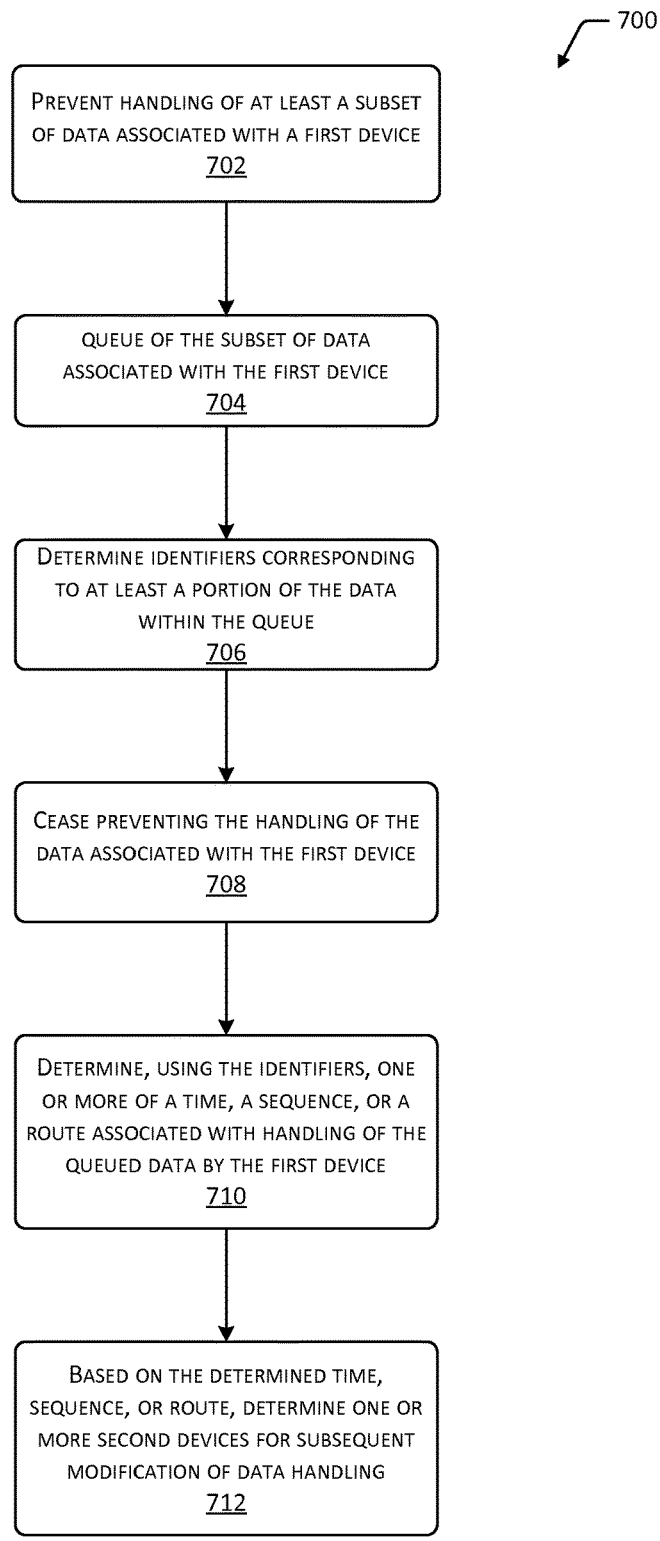
FIG. 7 is a flow diagram illustrating a method for determining one or more of a time or a sequence associated with transmission or processing of queued data.

FIG. 7 is a flow diagram 700 illustrating a method for determining one or more of a time or a sequence associated with transmission or processing of queued data.

Block 702 prevents handling of at least a subset of data associated with a first device. For example, modification instructions 114 may be provided to a production server 102 or a similar type of device. The modification instructions 114 may be configured to cause the production server 102 to cease one or more of the sending, receiving, or processing of requests 106 or responses 108 for a period of time.

Block 704 generates a queue of the subset of data associated with the first device. The queue may include at least a portion of the data that was not handled by the first device during a delay time period 302 associated with the modification instructions 114. For example, other devices within a system 200 may route data to different production servers 102 if a first production server 102(1) does not respond to a request 106 within a threshold length of time. Therefore, the queue may not necessarily include all of the data that was affected by the modification instructions 114.

Block 706 determines identifiers corresponding to at least a portion of the data within the queue. For example, requests 106, responses 108, and other types of data may include one or more unique identifiers. The identifiers may be used to track data and operations performed using the data within a system 200. Continuing the example, the identifiers may be used to determine the times at which particular data is processed, the devices that process the data, the devices that route the data, and so forth. When data is placed in a queue associated with a device affected by the modification instructions 114, identifiers associated with the data may be determined. In other implementations, data may be queued and subsequently released at the end of a delay time period 302 without determining associated identifiers of the data.

Block 708 ceases preventing the handling of the data associated with the first device. When the first device resumes the sending, receiving, and processing of data, the first device may begin handling data released from the queue. In some implementations, the queued data may be released for sending, receiving, or processing over a period of time, such as a time ranging from 10 ms to 50 ms. In other implementations, the queued data may be released for sending, receiving, or processing generally instantaneously.

Block 710 determines, using the identifiers, one or more of a time, a sequence, or a route associated with handling of the queued data by the first device. As queued data is sent, received, or processed, the identifier associated with that data may be determined. The time and sequence of the identifiers determined at the time that the data was queued may differ from the time and sequence of the identifiers determined at the time that the queued data is sent, received or processed by the first device. The time or sequence in which individual requests 106, responses 108, or other data are sent, received, or processed by the first device may provide additional information regarding the latency or other metric data 110 associated with a particular subset of data. Additionally, the devices to which particular data is routed when queued data is sent, received, or processed may differ from devices to which data is routed during normal operations. In other implementations, the identifiers associated with particular data may be used to determine one or more of a rate of transmission of data (e.g., a velocity) or a positive or negative rate of change of the velocity of the data transmission (e.g., an acceleration).

Based on the determined time, sequence or route, block 712 determines one or more second devices for subsequent modification of data handling. For example, if it is determined that data released from the queue associated with a first device is routed to one or more second devices, modification instructions 114 may be provided to the one or more second devices to affect the handling of data by the second device to further determine relationships between the second device and other devices.

Figure 8:
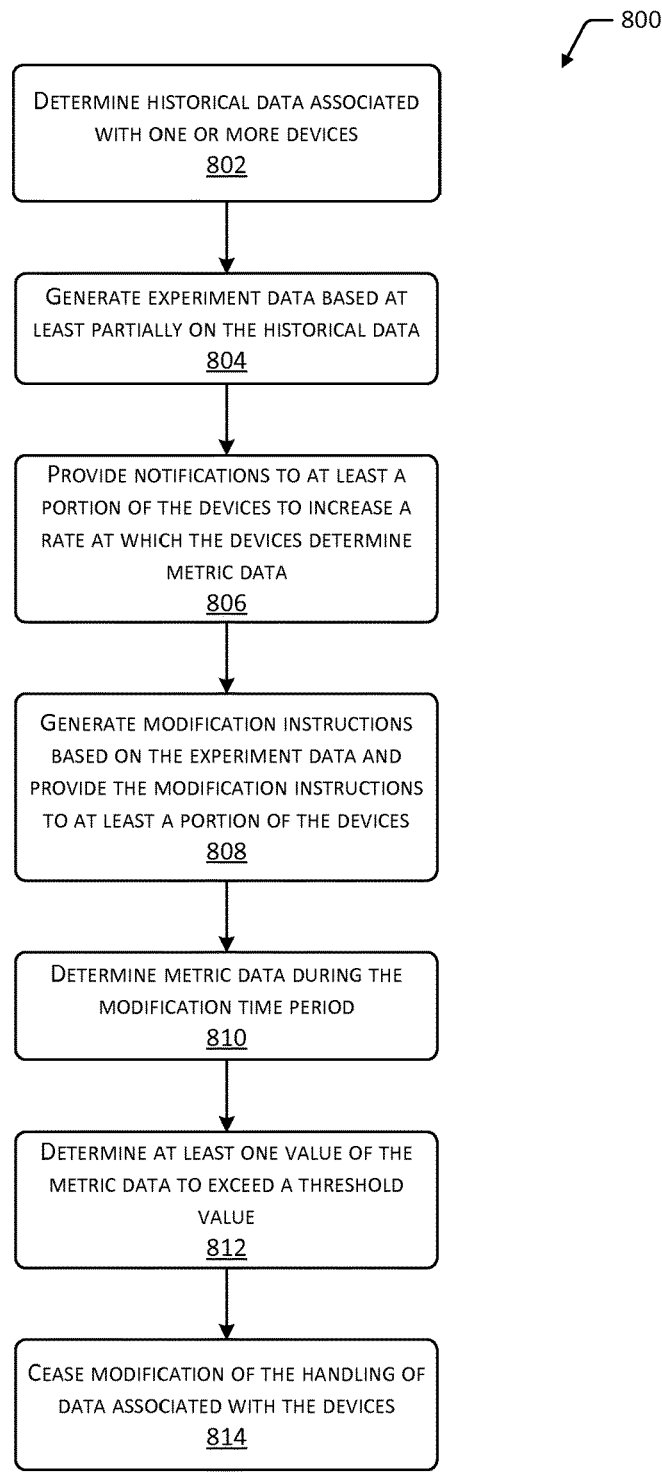
FIG. 8 is a flow diagram illustrating a method for generating experiment data and modification instructions based at least partially on historical data.

FIG. 8 is a flow diagram 800 illustrating a method for generating experiment data 206 and modification instructions 114 based at least partially on historical data. Block 802 determines historical data associated with one or more devices. For example, system data 208 may include historical data regarding operation of one or more production servers 102 or other devices within a system 200. Continuing the example, historical metric data 110 may be indicative of load, latency, error rate, processor utilization, or other metric values associated with one or more devices during previous modifications to the system 200. Historical metric data 110 may also be indicative of metric values during previous periods of normal system operations.

Block 804 generates experiment data 206 based at least partially on the historical data. For example, the experiment data 206 may include device identifiers 508 that correspond to one or more particular devices determined using historical data. The experiment module 204 may determine a potential relationship between metric values associated with particular devices that may be confirmed or disproven by providing data modifications 532 to the handling of data by one or more devices. In some implementations, the experiment module 204 may select one or more particular devices that may yield relevant data while minimizing impact on user experiences. The experiment data 206 may also include resource identifiers 510 and data modifications 532 indicative of particular types of modifications to the handling of particular subsets of data. The experiment module 204 may determine particular resources 202 and particular data modifications 532 based on historical data. The experiment data 206 may further include time data 534 indicative of the time at which a data modification 532 may be initiated and ended as well as the duration of the data modification 532. The time data 534 may be generated using historical data. For example, the time data 534 generated by the experiment module 204 may include a length of time that will be generally unaffected by external events, such as holidays, product launches, weekends, and so forth. The time data 534 may further include a length of time that will only minimally affect user experiences and maintain metric values that will not hinder system components or violate SLAs.

Block 806 provides notifications 214 to at least a portion of the devices to increase a rate 604 at which the devices determine metric data 110. Notifications 214 may include at least a portion of the time data 534. For example, the time data 534 may include a time at which one or more devices may begin determining metric data 110 at an increased rate 604. In some implementations, the notifications 214 may be configured to cause a device to begin determining metric data 110 at an increased rate without human intervention. In other implementations, the notifications 214 may be provided to a user associated with a device, and the user may increase the rate 604 at which metric data 110 is determined at a time indicated by the notification 214. The rate 604 at which metric data 110 is determined may be increased prior to providing modification instructions 114 to one or more devices. In other implementations, the rate 604 at which metric data 110 is determined may be increased at the time that the modification instructions 114 are provided to one or more devices. In still other implementations, the rate 604 at which metric data 110 is determined may remain unchanged for one or more devices.

Block 808 generates modification instructions 114 based on the experiment data 206 and provides the modification instructions 114 to at least a portion of the devices. The modification instructions 114 may be configured to prevent, delay, pause, queue, or change a rate associated with of the handling of at least a subset of data associated with one or more devices of a system 200. In other implementations, the modification instructions 114 may be configured to duplicate at least a portion of data associated with a device to increase the data handled by the device. In still other implementations, modification instructions 114 may be configured to cause the sending, receiving, or processing of at least a portion of the data to fail. The modification instructions 114 may include one or more device identifiers 508 indicative of the devices for which the handling of data is to be modified. The modification instructions 114 may also include one or more data modifications 532 indicative of the particular manner in which the handling of data is to be influenced. The data modifications 532 may affect the load associated with one or more devices, which may in turn affect one or more metric values associated with one or more other devices.

Block 810 determines metric data 110 during the modification time period associated with the data modification(s) 532. The metric data 110 determined during the modification time period may be indicative of the effect of the handling of data associated with one or more devices on one or more other devices. For example, a decrease in the handling of data associated with a first device may cause data to be routed to a second device, increasing one or more of the latency, error rate, or processor utilization associated with the second device. As another example, constraining or preventing the handling of data associated with a first device may prevent that first device from providing data to a second device, decreasing one or more of the latency, error rate, or processor utilization associated with the second device as it performs other operations. As yet another example, constraining or preventing the handling of a first subset of data associated with a first device may reduce the latency associated with the handling of a second subset of data by that first device.

Block 812 determines at least one value of the metric data 110 to exceed a threshold value 540. In some implementations, correspondence between determined metric data 110 and one or more threshold values 540 may be periodically or continuously determined during a monitoring time period 306. If one or more metric values exceed a threshold maximum, fall below a threshold minimum, or deviate from a reference value by more than a threshold quantity, this may indicate an unacceptable user experience, violation of a SLA, or a potential detriment to system components. Responsive to a determination that at least one value of the metric data 110 exceeds a threshold value 540, data modifications 532 may be ceased prior to the end of a modification time period. For example, block 814 ceases modification of the handling of data associated with one or more devices. In some implementations, metric values associated with a single device or set of devices may exceed a threshold value 540, and data modifications 532 associated with those particular devices may be ceased while data modifications 532 associated with other devices may be maintained.

Figure 9:
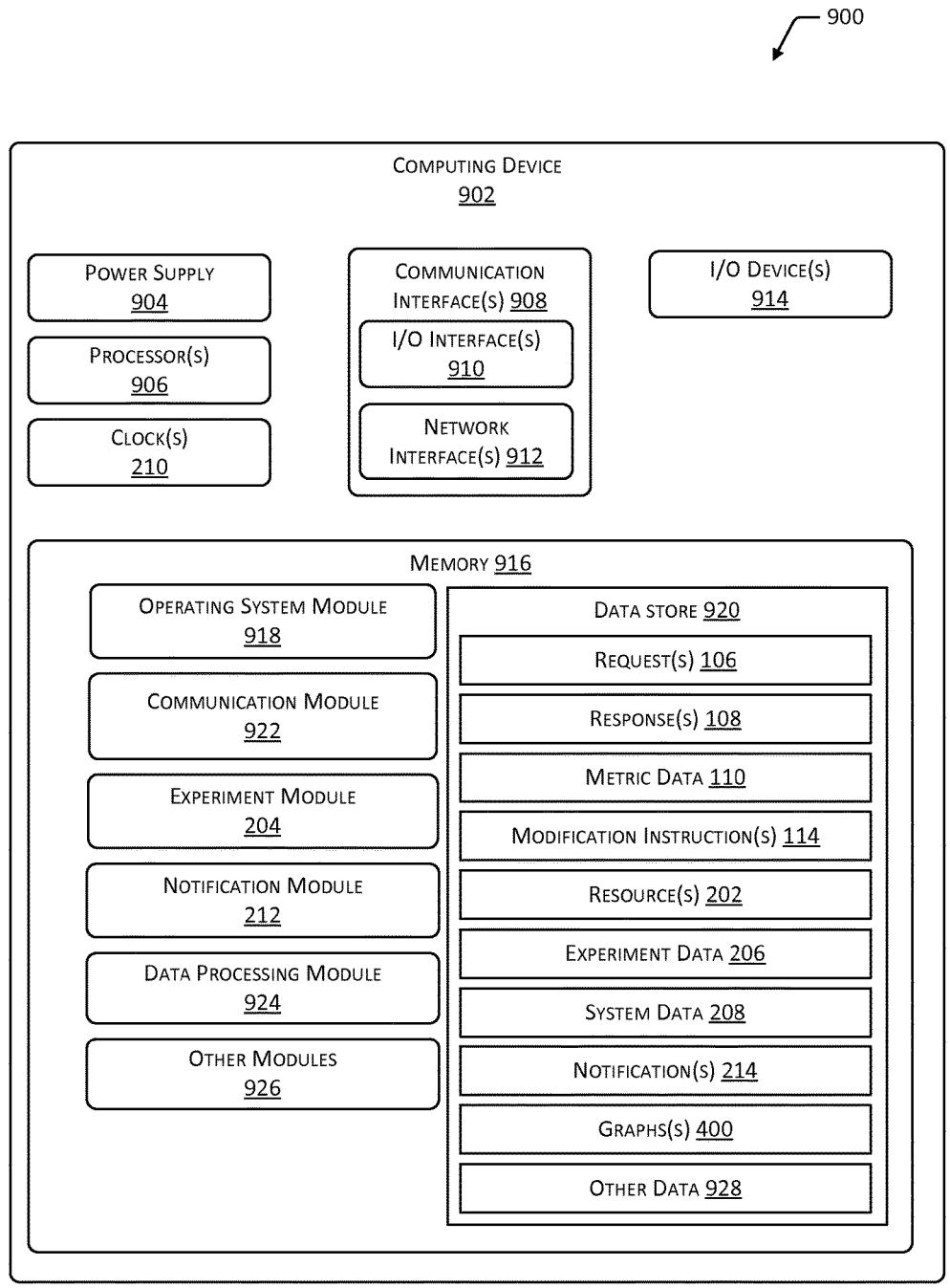
FIG. 9 is a block diagram illustrating a computing device within the scope of the present disclosure.

FIG. 9 is a block diagram 900 illustrating a computing device 902 within the scope of the present disclosure. The computing device 902 may include one or more user devices 104, production servers 102, experiment servers 112, or other devices in communication with the user devices 104, production servers 102, or experiment servers 112, such as load balancing devices.

One or more power supplies 904 may be configured to provide electrical power suitable for operating the components of the computing device 902. In some implementations, the power supply 904 may include a rechargeable battery, fuel cell, photovoltaic cell, power conditioning circuitry, and so forth.

The computing device 902 may include one or more hardware processor(s) 906 (processors) configured to execute one or more stored instructions. The processor(s) 906 may include one or more cores. One or more clocks 210 may provide information indicative of date, time, ticks, and so forth. For example, the processor(s) 906 may use data from the clock 210 to generate a timestamp, trigger a preprogrammed action, determine the time at which modification instructions 114 or other transmissions are to be sent, determine the time at which metric data 110 or other types of data are received, determine the lapse of a time period associated with a data modification 532, and so forth.

The computing device 902 may include one or more communication interfaces 908, such as I/O interfaces 910, network interfaces 912, and so forth. The communication interfaces 908 may enable the computing device 902, or components of the computing device 902, to communicate with other computing devices 902 or components of the other computing devices 902. The I/O interfaces 910 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include any manner of input device or output device associated with the computing device 902. For example, I/O devices 914 may include touch sensors, keyboards, mouse devices, microphones, image sensors (e.g., cameras), scanners, displays, speakers, haptic devices, printers, and so forth. In some implementations, the I/O devices 914 may be physically incorporated with the computing device 902 or may be externally placed.

The network interfaces 912 may be configured to provide communications between the computing device 902 and other devices, such as the I/O devices 914, routers, access points, and so forth. The network interfaces 912 may include devices configured to couple to one or more networks including LANs, wireless LANs, WANs, wireless WANs, and so forth. For example, the network interfaces 912 may include devices compatible with Ethernet, Wi-Fi, Bluetooth, ZigBee, Z-Wave, 3G, 4G, LTE, and so forth.

The computing device 902 may include one or more busses or other internal communications hardware or software that allows for the transfer of data between the various modules and components of the computing device 902.

As shown in FIG. 9, the computing device 902 may include one or more memories 916. The memory 916 may include one or more CRSM. The CRSM may be any one or more of an electronic storage medium, a magnetic storage medium, an optical storage medium, a quantum storage medium, a mechanical computer storage medium, and so forth. The memory 916 may provide storage of computer-readable instructions, data structures, program modules, and other data for the operation of the computing device 902. A few example modules are shown stored in the memory 916, although the same functionality may alternatively be implemented in hardware, firmware, or as a system on a chip (SoC).

The memory 916 may include one or more operating system (OS) modules 918. The OS module 918 may be configured to manage hardware resource devices such as the I/O interfaces 910, the network interfaces 912, the I/O devices 914, and to provide various services to applications or modules executing on the processors 906. The OS module 918 may implement a variant of the FreeBSDoperating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 920 and one or more of the following modules may also be stored in the memory 916. The modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including other computing devices 902, network attached storage devices, and so forth.

A communication module 922 may be configured to establish communications with one or more other computing devices 902, such as user devices 104, production servers 102, experiment servers 112, storage media, or other computing devices 902 in communication therewith. The communications may be authenticated, encrypted, and so forth. For example, the communication module 922 may be used to receive, generate, and provide requests 106 and responses 108 to and from other computing devices 902.

The memory 916 may store the experiment module 204, which may generate experiment data 206 indicative of one or more modifications to be applied to the handling of data associated with one or more computing devices 902. For example, the experiment data 206 may be indicative of particular computing devices 902 to which data modifications 532 are to be provided, particular subsets of data to which the data modifications 532 are to be applied, times at which the data modifications 532 will be initiated and ended, and the type(s) of data modifications 532 that will be generated. The experiment data 206 may also be indicative of particular computing devices 902 from which metric data 110 will be determined before, during, or after a modification time period, the rate 604 at which metric data 110 will be determined during each time period, and so forth. The experiment module 204 may access system data 208, and the experiment data 206 may be based at least partially on the system data 208. For example, system data 208 may include a list of at least a portion of the computing devices 902 associated with the system 200, historical data associated with one or more of the computing devices 902, one or more threshold values 540 associated with the system 200, particular computing devices 902, or subsets of data, and so forth. Based on the historical data and the threshold values 540, the experiment module 204 may determine computing devices 902, resources 202, data modifications 532, and time data 534 that may provide a minimal impact on user experiences and that may be unlikely to exceed the threshold values 540. In some implementations, the experiment module 204 may determine a potential relationship between one or more computing devices 902 based on the historical data, and the experiment data 206 may include parameters to prove or disprove the relationship.

The memory 916 may also store the notification module 212. The notification module 212 may generate one or more notifications 214 based at least partially on the experiment data 206. For example, a notification 214 may indicate at least a portion of the time data 534 associated with the experiment data 206. Continuing the example, a notification 214 may be configured to cause a computing device 902 to increase a rate 604 at which metric data 110 is determined for particular a period of time indicated by the time data 534.

The memory 916 may further store a data processing module 924, which may process metric data 110 received from one or more computing devices 902. The data processing module 924 may generate one or more graphs 400, equations, models, or other types of data based at least partially on the metric data 110. The data processing module 924 may determine relationship between metric values associated with a particular computing device 902 and those associated with other computing devices 902. For example, modification instructions 114, which may be stored in the data store 920, may affect the handling of data associated with a first computing device 902(1), which may in turn affect the metric data 110 determined from one or more other computing devices 902.

Other modules 926 may also be present in the memory 916. For example, encryption modules may be used to encrypt and decrypt communications between computing devices 902. Authentication modules may be used to authenticate communications sent or received by computing devices 902. Reporting modules may be used to generate reports that include at least a portion of the metric data 110, graphs 400, equations, models, and so forth, for output to one or more I/O devices 914. User interface modules may receive requests 106, system data 208, or experiment data 206 input by a user. Other modules 926 may also include data tracking modules, which may provide one or more requests 106, responses 108, or other types of data with identifiers and determine the manner in which the one or more requests 106, responses 108, or other data are routed within a system 200.

Other data 928 within the data store 920 may include user input data, such as configurations and settings associated with computing devices 902, libraries and other resources 202 for performing data processing, authentication credentials, certificates, and so forth. Other data 928 may also include identifiers associated with one or more requests 106 or responses 108.

In different implementations, different computing devices 902 may have different capabilities or capacities. For example, production servers 102 may have significantly more processor 906 capability and memory 916 capacity compared to the processor 906 capability and memory 916 capacity of user devices 104.

The processes discussed in this disclosure may be implemented in hardware, software, or a combination thereof. In the context of software, the described operations represent computer-executable instructions stored on one or more CRSM that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and one or more hardware processors configured to execute the computer-executable instructions to:
access a first device within a distributed system, wherein the first device handles production data including one or more of requests or responses associated with one or more resources;
prevent handling of the production data by the first device for a delay time period;
determine first metric data associated with the first device and a second device within the distributed system for a first monitoring time period that includes the delay time period;
determine second metric data associated with the first device and the second device for a second monitoring time period that includes one or more additional time periods subsequent to the delay time period, wherein the first metric data and the second metric data include one or more of latency data, error rate data, or processor utilization data;
determine, based at least partially on the first metric data, an effect on one or more of a latency, an error rate, or a processor utilization of the second device caused by a reduction in the handling of the production data by the first device;
determine, based at least partially on the second metric data, an effect on the one or more of the latency, the error rate, or the processor utilization of the second device caused by an increase in the handling of the production data by the first device;
generate, using the first metric data and the second metric data, a model that associates changes in the handling of the production data by the first device with the one or more of the latency, the error rate, or the processor utilization of the second device;
receive a request from the second device; and
using the model, control the handling of the production data by the first device to reduce the one or more of the latency, the error rate, or the processor utilization associated with the request of the second device.

2. The system of claim 1, wherein the delay time period is between ten milliseconds and one hundred milliseconds in duration, the system further comprising computer-executable instructions to:
queue the production data associated with the first device during the delay time period;
determine a lapse of the delay time period; and
release the production data from the queue for processing by the first device after lapsing of the delay time period.

3. The system of claim 1, further comprising computer-executable instructions to: determine third metric data associated with a time period prior to the delay time period, wherein the third metric data is indicative of the one or more of latency data, error rate data, or processor utilization data of the second device associated with unmodified handling of the production data by the first device, wherein the model is further generated based at least in part on the third metric data.

4. The system of claim 1, further comprising computer-executable instructions to:
  determine one or more identifiers of at least a portion of the production data associated with the delay time period;
  determine handling of the at least a portion of the production data by determining the one or more identifiers of the at least a portion of the production data; and
  determine a timing corresponding to the at least a portion of the production data, wherein the timing is indicative of one or more of a sending time, a receipt time, an order of sending, an order of receipt, a rate of acceleration, or a rate of transmission.

5. A system comprising:
  one or more memories storing computer-executable instructions; and
    one or more hardware processors configured to execute the computer-executable instructions to:
    access production data associated with access to one or more resources by a first device; modify handling of at least a portion of the production data by the first device for a modification time period; determine first metric data associated with one or more of the first device or a second device for a monitoring time period that includes the modification time period, wherein the first metric data is indicative of an effect on one or more of a latency, an error rate, or a processor utilization, or a throughput of the second device associated with one or more of a reduction or an increase in the handling of the production data by the first device;
    determine second metric data associated with the one or more of the first device or the second device for one or more additional time periods prior to or subsequent to the modification time period, wherein the second metric data is indicative of an effect on the one or more of the latency, the error rate, the processor utilization, or the throughput of the second device associated with unmodified handling of the production data by the first device;
    access historical data corresponding to at least one previous modification of the handling of the at least a portion of the production data;
    based at least partially on the first metric data, the second metric data, and the historical data, generate a model that associates one or more changes to handling of data by the second device associated with the handling of the at least a portion of the production data by the first device; and
    using the model, control the handling of the at least a portion of the production data by the first device to modify the one or more of the latency, the error rate, the processor utilization, or the throughput associated with the handling of one or more of a request or a response associated with the second device.

6. The system of claim 5, wherein the computer-executable instructions to modify the handling of the at least a portion of the production data by the first device include computer-executable instructions to:
  change a rate of one or more of sending, receiving, or processing of the at least a portion of the production data by the first device for the modification time period.

7. The system of claim 5, wherein the computer-executable instructions to modify the handling of the at least a portion of the production data by the first device include computer-executable instructions to:
  route the at least a portion of the production data from the first device to a third device for the modification time period; or
  route the at least a portion of the production data from the third device to the first device for the modification time period.

8. The system of claim 5, wherein the computer-executable instructions to modify the handling of the at least a portion of the production data by the first device include computer-executable instructions to:
  cause a failure to process at least one request within the at least a portion of the production data.

9. The system of claim 5, wherein the computer-executable instructions to modify the handling of the at least a portion of the production data by the first device include computer-executable instructions to:
  duplicate the at least a portion of the production data associated with the first device.

10. The system of claim 5, wherein the computer-executable instructions to modify the handling of the at least a portion of the production data by the first device include computer-executable instructions to:
  queue the at least a portion of the production data associated with the first device for the modification time period; and
  release the at least a portion of the production data from the queue over a period of time subsequent to the modification time period.

11. The system of claim 5, wherein the computer-executable instructions to modify the handling of the at least a portion of the production data by the first device include computer-executable instructions to prevent one or more of sending, processing, or receiving of the at least a portion of the production data by the first device for the modification time period,
  the computer-executable instructions for generating the model including computer-executable instructions to:
  determine a first effect of the production data received by the first device prior to the modification time period; and
  determine a second effect of an increase in the production data handled by the first device associated with a length of time subsequent to the modification time period.

12. The system of claim 5, further comprising computer-executable instructions to:
  determine, based at least partially on the historical data, an association between the handling of the at least a portion of the production data by the first device and the handling of data by the second device; and
  select the first device for modification of the handling of the at least a portion of the production data based at least partially on the association.

13. The system of claim 5, wherein the computer-executable instructions to determine one or more of the first metric data or the second metric data associated with the one or more of the first device or the second device include computer-executable instructions to:
  provide a notification to the one or more of the first device or the second device indicative of a time associated with modification of the handling of the at least a portion of the production data by the first device, wherein the notification is configured to increase a rate of collection of the one or more of the first metric data or the second metric data by the one or more of the first device or the second device for one or more of the modification time period or the monitoring time period; and receive the one or more of the first metric data or the second metric data from the one or more of the first device or the second device.

14. The system of claim 5, wherein the computer-executable instructions to modify the handling of the at least a portion of the production data by the first device include computer-executable instructions to prevent one or more of sending, processing, or receiving of the at least a portion of the production data by the first device for the modification time period and queue the at least a portion of the production data, the system further comprising computer-executable instructions to:

determine one or more identifiers associated with the at least a portion of the production data within the queue;

subsequent to the modification time period, determine one or more of sending, processing, or receiving of the production data released from the queue based at least partially on the one or more identifiers; and storing, as the second metric data associated with the production data released from the queue, one or more of a sending time, a receiving time, an order of sending, an order of receipt, a rate of acceleration, a rate of transmission, a device identifier, or the one or more identifiers associated with the at least a portion of the production data.

15. A system comprising:

one or more memories storing computer-executable instructions; and one or more hardware processors configured to execute the computer-executable instructions to:

modify a rate at which production data is handled by a first device of a plurality of devices for a delay time period, wherein the production data includes one or more of requests or responses associated with one or more resources;

determine metric data associated with at least a subset of the plurality of devices for a monitoring time period equal to or longer than the delay time period, wherein the metric data is indicative of an effect of the production data handled by the first device on the at least a subset of the plurality of devices;

determine, based at least partially on the metric data, a relationship between the production data handled by the first device and one or more latency, error rate, or processor utilization of a subset of the plurality of devices;

generate a model, based at least partially on the relationship, wherein the model associates handling of the production data by the first device with the one or more of the latency, the error rate, of the processor utilization of the at least a subset of the plurality of devices; and using the model, control handling of the production data by the first device to increase a throughput associated with handling of one or more of a request or a response associated with a second device of the at least a subset of the plurality of devices.

16. The system of claim 15, further comprising computer-executable instructions to:

determine at least one value of the metric data to exceed a threshold value; and modify the rate of at which the production data is handled based at least partially on the determination of the at least one value exceeding the threshold value.

17. The system of claim 15 wherein the model includes one or more of a graph or an equation associating the production data handled by the first device with the one or more of the latency, the error rate, or the processor utilization of the at least a subset of the plurality of devices.

18. The system of claim 15, further comprising computer-executable instructions to:

determine, based at least partially on the metric data, at least a portion of the effect on the second device of the at least a subset of the plurality of devices; modify a rate of at which the production data is handled by the second device for a second delay time period; and determine second metric data associated with the at least a subset of the plurality of devices for a second monitoring time period equal to or longer than the second delay time period, wherein the second metric data is indicative of an effect of the handling of the production data by the second device on the at least a subset of the plurality of devices.

19. The system of claim 15, further comprising computer-executable instructions to:

determine, based at least partially on the metric data, a subset of the production data handled by the first device associated with the effect on the at least a subset of the plurality of devices;

modify handling of the subset of the production data by the first device for a second delay time period; and determine second metric data associated with the at least a subset of the plurality of devices for a second monitoring time period equal to or longer than the second delay time period, wherein the second metric data is indicative of an effect of the handling of the subset of the production data by the first device on the at least a subset of the plurality of devices.

20. The system of claim 15, further comprising computer-executable instructions to:

access historical data associated with one or more of the first device or the at least a subset of the plurality of devices;

access at least one threshold metric value associated with the one or more of the first device or the at least a subset of the plurality of devices; and determine, based at least partially on the historical data and the at least one threshold metric value, a length of the delay time period, wherein the length of the delay time period is configured to prevent the metric data from exceeding the at least one threshold metric value.

* * * * *

UNITED STATES PATENT AND TRADEMARK OFFICE
CERTIFICATE OF CORRECTION

PATENT NO. : 10,091,068 B1
APPLICATION NO. : 14/727179
DATED : October 2, 2018
INVENTOR(S) : Paul Derek Demarco, Anton Vladilenovich Goldberg and Michael James McInerny Page 1 of 1

It is certified that error appears in the above-identified patent and that said Letters Patent is hereby corrected as shown below:

In the Claims

Column 35, Lines 49-51 should read:
determine, based at least partially on the metric data, a relationship between the production data handled by the first device and one or more of latency, error rate, or processor utilization of at least a subset of the plurality devices;

Signed and Sealed this
Fourth Day of December, 2018

Andrei Iancu
*Director of the United States Patent and Trademark Office*